United States Patent
Kim et al.

(10) Patent No.: US 11,102,812 B2
(45) Date of Patent: *Aug. 24, 2021

(54) METHOD OF TRANSMITTING UPLINK SIGNAL FROM USER EQUIPMENT IN A WIRELESS COMMUNICATION SYSTEM SUPPORTING UNLICENSED BAND AND APPARATUS SUPPORTING THE SAME

(71) Applicant: LG Electronics Inc., Seoul (KR)

(72) Inventors: Seonwook Kim, Seoul (KR); Changhwan Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,182

(22) Filed: Nov. 7, 2019

(65) Prior Publication Data

US 2020/0077438 A1    Mar. 5, 2020

Related U.S. Application Data

(63) Continuation of application No. 16/248,618, filed on Jan. 15, 2019, now Pat. No. 10,536,972, which is a
(Continued)

(51) Int. Cl.
*H04W 74/00* (2009.01)
*H04W 74/04* (2009.01)
(Continued)

(52) U.S. Cl.
CPC .......... *H04W 74/04* (2013.01); *H04W 16/14* (2013.01); *H04W 74/006* (2013.01); *H04W 74/08* (2013.01)

(58) Field of Classification Search
None
See application file for complete search history.

(56) References Cited

U.S. PATENT DOCUMENTS

2016/0057746 A1    2/2016  Drucker
2017/0202054 A1    7/2017  Rathonyi et al.
(Continued)

FOREIGN PATENT DOCUMENTS

KR    1020160004626    1/2016
KR    1020160150276    12/2016
(Continued)

OTHER PUBLICATIONS

Extended European Search Report in European Application No. 18829176.9, dated Feb. 18, 2020, 14 pages.
(Continued)

*Primary Examiner* — Brandon M Renner
(74) *Attorney, Agent, or Firm* — Fish & Richardson P.C.

(57) ABSTRACT

Disclosed herein is a method of transmitting a UL signal from a user equipment (UE) in a wireless communication system supporting an unlicensed band and apparatuses for supporting the same. More specifically, the present invention provides an embodiment in which the UE performs autonomous uplink transmission and scheduled uplink transmission through the unlicensed band, a method of adjusting contention window size when the UE perform the autonomous uplink transmission through the unlicensed band, and an embodiment of performing the autonomous uplink transmission based on the method.

15 Claims, 18 Drawing Sheets

Related U.S. Application Data continuation of application No. PCT/KR2018/008886, filed on Aug. 6, 2018.

(60) Provisional application No. 62/627,623, filed on Feb. 7, 2018, provisional application No. 62/587,437, filed on Nov. 16, 2017, provisional application No. 62/584,124, filed on Nov. 10, 2017, provisional application No. 62/570,591, filed on Oct. 10, 2017, provisional application No. 62/564,186, filed on Sep. 27, 2017, provisional application No. 62/543,965, filed on Aug. 10, 2017, provisional application No. 62/541,107, filed on Aug. 4, 2017.

(51) Int. Cl.
*H04W 74/08* (2009.01)
*H04W 16/14* (2009.01)

(56) References Cited

U.S. PATENT DOCUMENTS

| | | |
|---|---|---|
| 2017/0230838 A1 | 8/2017 | Yerramalli et al. |
| 2018/0092043 A1 | 3/2018 | Yerramalli et al. |
| 2018/0092072 A1 | 3/2018 | Babaei et al. |
| 2018/0110063 A1 | 4/2018 | Fan |
| 2018/0146480 A1 | 5/2018 | Chendamarai Kannan et al. |
| 2018/0176787 A1 | 6/2018 | Fakoorian et al. |
| 2018/0206127 A1 | 7/2018 | Zhang et al. |
| 2018/0227886 A1 | 8/2018 | Chou et al. |
| 2018/0227936 A1 | 8/2018 | Yerramalli et al. |
| 2019/0141681 A1 | 5/2019 | Wang et al. |
| 2019/0159256 A1 | 5/2019 | Talarico et al. |
| 2020/0052865 A1 | 2/2020 | Liou et al. |
| 2020/0187228 A1* | 6/2020 | Cheng ............... H04W 72/1289 |
| 2020/0267728 A1* | 8/2020 | Frederiksen ...... H04W 72/0453 |

FOREIGN PATENT DOCUMENTS

| | | |
|---|---|---|
| WO | 2014039141 | 3/2014 |
| WO | WO2017099860 | 6/2017 |

OTHER PUBLICATIONS

Ericsson, "On Autonomous UL Transmissions for NR in Unlicensed Spectrum," R1-1711521, 3GPP TSG RAN WG1 NR Ad-Hoc#2, Qingdao, P.R. China,, dated Jun. 27-30, 2017, 3 pages, XP051300706.

Samsung, "Channel access for autonomous UL access," R1-1717552, 3GPP TSG RAN WG1 Meeting 90bis, Prague, CZ, dated Oct. 9-13, 2017, 5 pages, XP051351901.

Intel Corporation, "Uplink partial subframe transmission for FS3," R1-1707298, 3GPP TSG RAN WG1 Meeting #89, Hangzhou, P.R. China, May 15-19, 2017, 5 pages.

Qualcomm Incorporated, "Multiple starting positions in a subframe for DL," R1-1708885, 3GPP TSG RAN WG1 #89, Hangzhou, China, May 15-19, 2017, 4 pages.

Ericsson, "On Autonomous UL Transmissions for NR in Unlicensed Spectrum," R1-1708956, 3GPP TSG RAN WG1 Meeting #89, Hangzhou, P.R. China, May 15-19, 2017, 3 pages.

Ericsson, "Multiple starting and ending positions for LAA UL," R1-1708962, 3GPP TSG RAN WG1 Meeting #89, Hangzhou, P.R. China, May 15-19, 2017, 3 pages.

Ericsson, "Autonomous UL access for LAA unlicensed cells," R1-1708963, 3GPP TSG RAN WG1 Meeting #89, Hangzhou, P.R. China, May 15-19, 2017, 3 pages.

ASUSTeK, "Discussion on Autonomous UL Access for LAA," R1-1709048, 3GPP TSG RAN WG1 Meeting #89, Hangzhou, China, May 15-19, 2017, 3 pages.

Broadcom Limited, CableLabs, "Discussion on multiple starting and ending positions for UL in LAA," R1-1709058, 3GPP TSG-RAN WG1 Meeting #89, Hangzhou, May 15-19, 2016, 6 pages.

LG Electronics, "Discussion on multiple starting and ending positions for LAA UL," R1-1709160, 3GPP TSG RAN WG1 Meeting #89, Hangzhou, P.R. China, May 15-19, 2017, 4 pages.

LG Electronics, "WF on channel access for consecutive AUL and SUL bursts," R1-1803164, 3GPP TSG RAN WG1 #88, Athens, Greece, Feb. 13-17, 2017, 3 pages.

Japanese Office Action in Japanese Appln. No. 2019-538491, dated Oct. 13, 2020, 5 pages.

LG Electronics, "Channel access procedure for autonomous UL access," R1-1713085, 3GPP TSG RAN WG1 Meeting #90, Prague, Czech Republic, Aug. 21-25, 2017, 4 pages.

Qualcomm Incorporated, "HARQ for Autonomous Uplink Access," R1-1713027, 3GPP TSG RAN WG1 #90, Prague, Czech, dated Aug. 21-25, 2017, 3 pages.

Samsung, "Resource allocation for autonomous UL access," R1-1713522, 3GPP TSG RAN WG1 Meeting #90, Prague, Czechia, dated Aug. 21-25, 2017, 4 pages.

United States Office Action in U.S. Appl. No. 16/735,848, dated Oct. 8, 2020, 20 pages.

U.S. Notice of Allowance in U.S. Appl. No. 16/735,848, dated May 3, 2021, 8 pages.

\* cited by examiner

METHOD OF TRANSMITTING UPLINK SIGNAL FROM USER EQUIPMENT IN A WIRELESS COMMUNICATION SYSTEM SUPPORTING UNLICENSED BAND AND APPARATUS SUPPORTING THE SAME

CROSS-REFERENCE TO RELATED APPLICATIONS

This application is a continuation of U.S. application Ser. No. 16/248,618, filed on Jan. 15, 2019, now allowed, which is a continuation of International Application No. PCT/KR2018/008886, filed on Aug. 6, 2018, which claims the benefit of U.S. Provisional Application No. 62/541,107, filed on Aug. 4, 2017, 62/543,965, filed on Aug. 10, 2017, 62/564,186, filed on Sep. 27, 2017, 62/570,591, filed on Oct. 10, 2017, 62/584,124, filed on Nov. 10, 2017, 62/587,437, filed on Nov. 16, 2017 and 62/627,623, filed on Feb. 7, 2018, which are all hereby incorporated by reference herein in their entirety.

TECHNICAL FIELD

The following description relates to a wireless communication system, and more particularly, to a method of transmitting uplink signals from a user equipment (UE) in a wireless communication system supporting an unlicensed band and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention is to provide a method of transmitting uplink signals in a wireless communication system supporting an unlicensed band and apparatuses supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting uplink signals from a user equipment (UE) to a base station in a wireless communication system supporting an unlicensed band and an apparatus supporting the same.

In one aspect of the present invention, provided herein is a method of transmitting uplink signals from a user equipment (UE) to a base station in a wireless communication system supporting an unlicensed band, the method including receiving downlink control information (DCI) scheduling uplink transmission immediately after activated autonomous uplink (AUL) transmission, in a time domain, and performing the AUL transmission and the uplink transmission through the unlicensed band based on a first method or a second method, wherein the first method corresponds to a method that the UE terminates ongoing AUL transmission a certain time interval before the uplink transmission and performs the uplink transmission, and wherein the second method corresponds to a method that the UE performs the AUL transmission and the uplink transmission continuously.

Herein, the certain time interval may correspond to an N (where N is a natural number) symbol interval.

Herein, when a priority class of the AUL transmission may be larger than or equal to a priority class of the uplink transmission, and a sum of durations of the AUL transmission and the uplink transmission may be smaller than a maximum channel occupancy time (MCOT) corresponding to the priority class of the AUL transmission, the UE may perform the AUL transmission and the uplink transmission based on the second method.

In the configuration above, when the UE performs the AUL transmission and the uplink transmission based on the first method, the UE may perform the AUL transmission based on a first channel access procedure (CAP) for the AUL transmission and the uplink transmission based on a second CAP for the uplink transmission.

Alternatively, when the UE performs the AUL transmission and the uplink transmission based on the second method, the UE may perform the AUL transmission and the uplink transmission continuously based on a channel access procedure (CAP) for the AUL transmission.

In the configuration above, a first DCI activating first AUL transmission and a second DCI releasing the first AUL transmission may be distinguished from a third DCI including acknowledgement information corresponding to the first AUL transmission based on a value of a first field.

In this case, the first field may correspond to a physical uplink shared channel (PUSCH) trigger A field.

In addition, the first DCI may be distinguished from the second DCI based on a value of a second field. Herein, the second field may correspond to a timing offset field.

In this case, the first DCI, the second DCI and the third DCI may have an identical size.

In addition, the first DCI, the second DCI and the third DCI may be scrambled by a radio network temporary identifier (RNTI) different from a cell-RNTI (C-RNTI).

In another aspect of the present invention, provided herein is a user equipment (UE) for transmitting uplink signals to a base station in a wireless communication system supporting an unlicensed band, the UE including a transmitter, a receiver, and a processor operatively connected to the transmitter and the receiver, wherein the processor is configured to receive downlink control information (DCI) scheduling uplink transmission immediately after activated autonomous uplink (AUL) transmission, in a time domain, and perform the AUL transmission and the uplink transmission through the unlicensed band based on a first method or a second method, wherein the first method corresponds to a method that the UE terminates ongoing AUL transmission a certain time interval before the uplink transmission and performs the uplink transmission, and wherein the second method corresponds to a method that the UE performs the AUL transmission and the uplink transmission continuously.

In still another aspect of the present invention, provided herein is a method of transmitting uplink signals from a user equipment (UE) to a base station in a wireless communication system supporting an unlicensed band, the method including performing activated first autonomous uplink (AUL) transmission through the unlicensed band, when downlink control information (DCI) including an uplink grant scheduling uplink transmission or acknowledgement information is not received during a certain time after the first AUL transmission, increasing contention window sizes (CWSs) corresponding to all channel access priority classes, and performing activated second AUL transmission through the unlicensed band based on the increased CWSs.

Herein, the DCI may correspond to DCI including an uplink grant for scheduling a retransmission with respect to the first AUL transmission or acknowledgment information with respect to the first AUL transmission.

In addition, the certain time may correspond to one or more subframes.

Additionally, when the first AUL transmission or the second AUL transmission is performed in a plurality of cells, starting positions of the first AUL transmission or the second AUL transmission in the plurality of cells may be configured to be identical.

In the configuration above, the UE may perform the first AUL transmission based on a first channel access procedure (CAP) for the first AUL transmission, and wherein the UE may perform the second AUL transmission based on a second CAP for the second AUL transmission, the increased CWSs being applied to the second CAP.

In the configuration above, a first DCI activating the first AUL transmission and a second DCI releasing the first AUL transmission may be distinguished from a third DCI including acknowledgement information corresponding to the first AUL transmission based on a value of a first field.

Herein, the first field may correspond to a physical uplink shared channel (PUSCH) trigger A field.

In addition, the first DCI may be distinguished from the second DCI based on a value of a second field. Herein, the second field may correspond to a timing offset field.

Herein, the first DCI, the second DCI and the third DCI may have an identical size.

In addition, the first DCI, the second DCI and the third DCI may be scrambled by a radio network temporary identifier (RNTI) different from a cell-RNTI (C-RNTI).

In yet another aspect of the present invention, provided herein is a user equipment (UE) for transmitting uplink signals to a base station in a wireless communication system supporting an unlicensed band, the UE including a transmitter, a receiver, and a processor operatively connected to the transmitter and the receiver, wherein the processor is configured to perform activated first autonomous uplink (AUL) transmission through the unlicensed band, increase, when downlink control information (DCI) including an uplink grant scheduling uplink transmission or acknowledgement information is not received during a certain time after the first AUL transmission, contention window sizes (CWSs) corresponding to all channel access priority classes, and perform activated second AUL transmission through the unlicensed band based on the increased CWSs.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a user equipment (UE) may efficiently perform autonomous uplink (AUL) transmission and scheduled UL transmission/reception.

More specifically, according to the present invention, the UE may minimize interference to other transmission nodes and a contention-based channel access procedure for signal transmission in the unlicensed band and perform activated AUL transmission and uplink transmission scheduled through a UL grant.

In addition, according to the present invention, downlink control information activating/deactivating the AUL transmission or including acknowledgment information with respect to the AUL transmission may be distinguished from other downlink control information.

Further, according to the present invention, the UE may conservatively adjust a contention window size for the AUL transmission.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Figure 1:
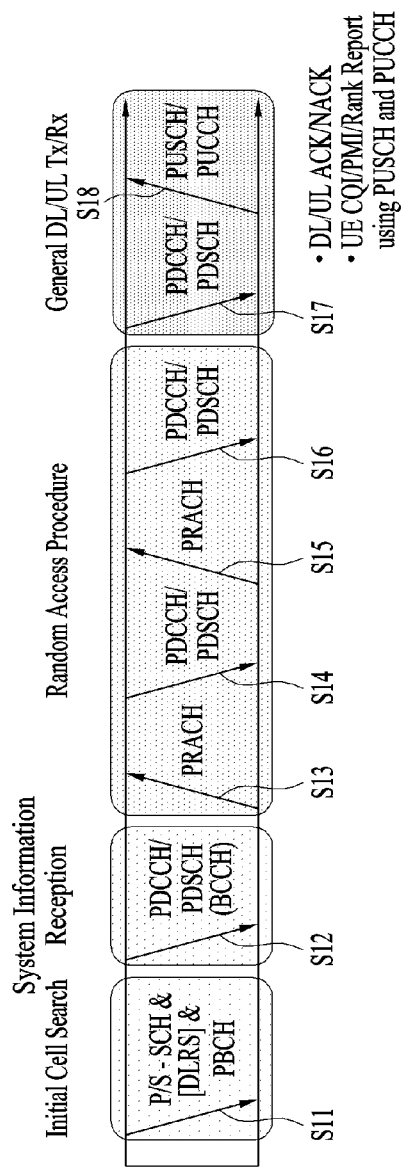
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

In order to clarify the technical features of the present invention, embodiments of the present invention are described mainly focusing on the 3GPP LTE/LTE-A system and the 3GPP NR system. It should be noted, however, that the embodiments are applicable even to the IEEE 802.16e/m system and the like.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
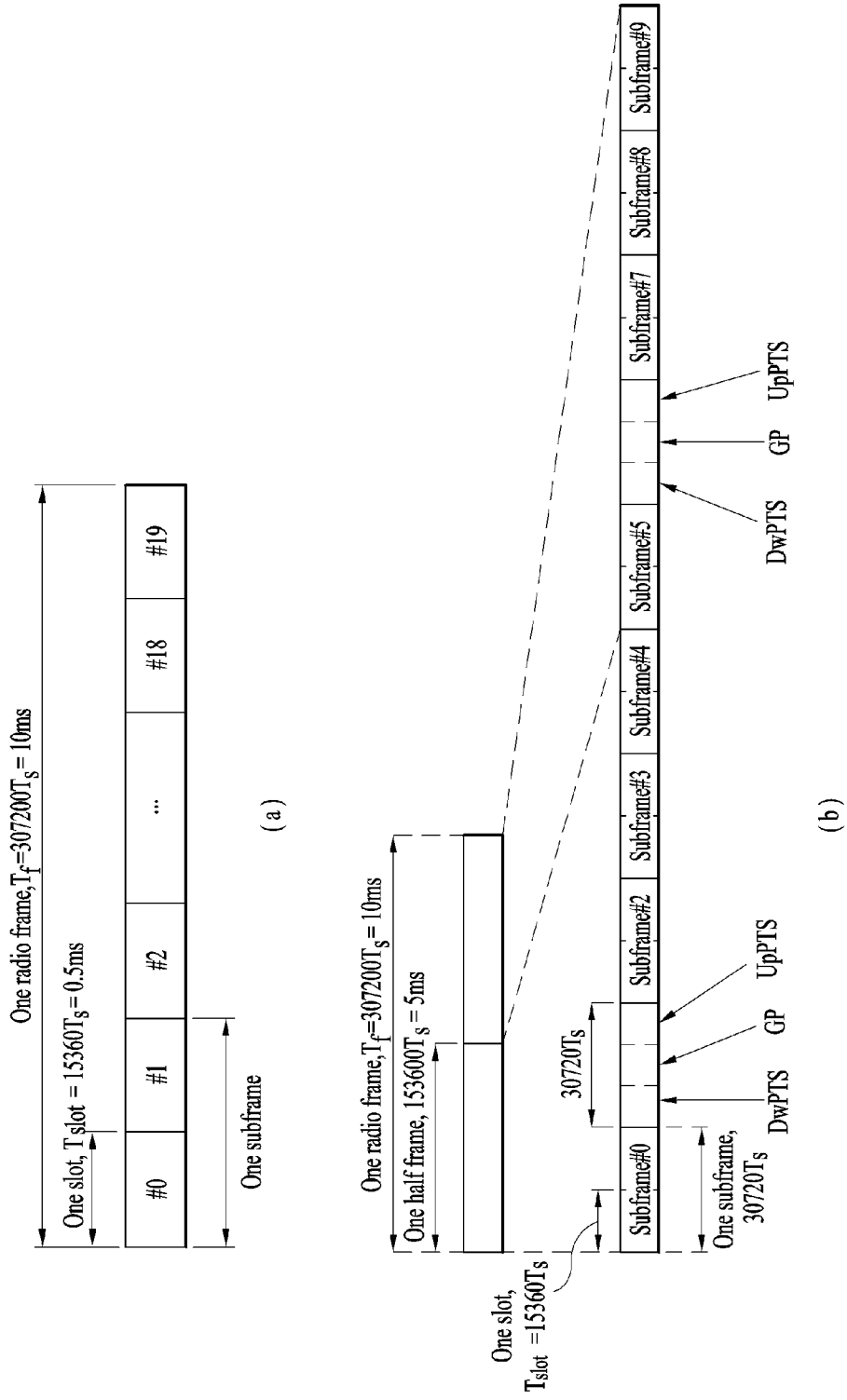
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
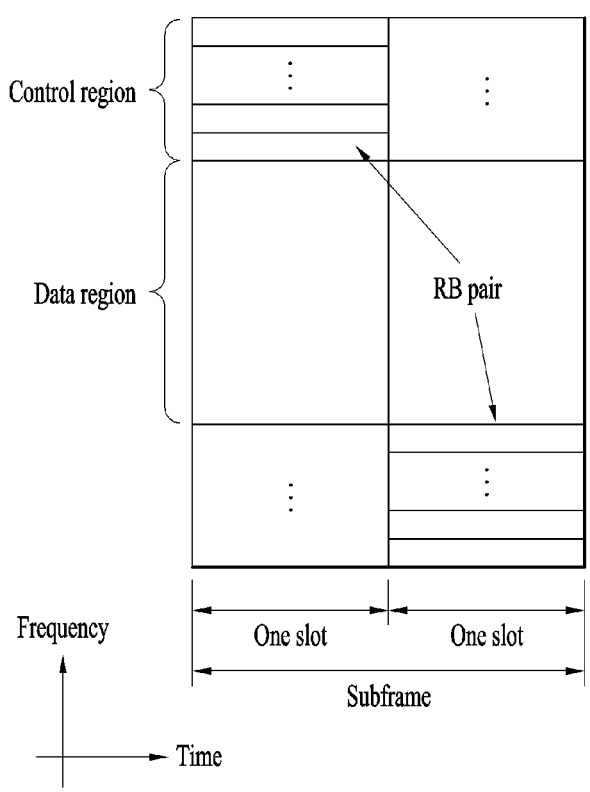
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
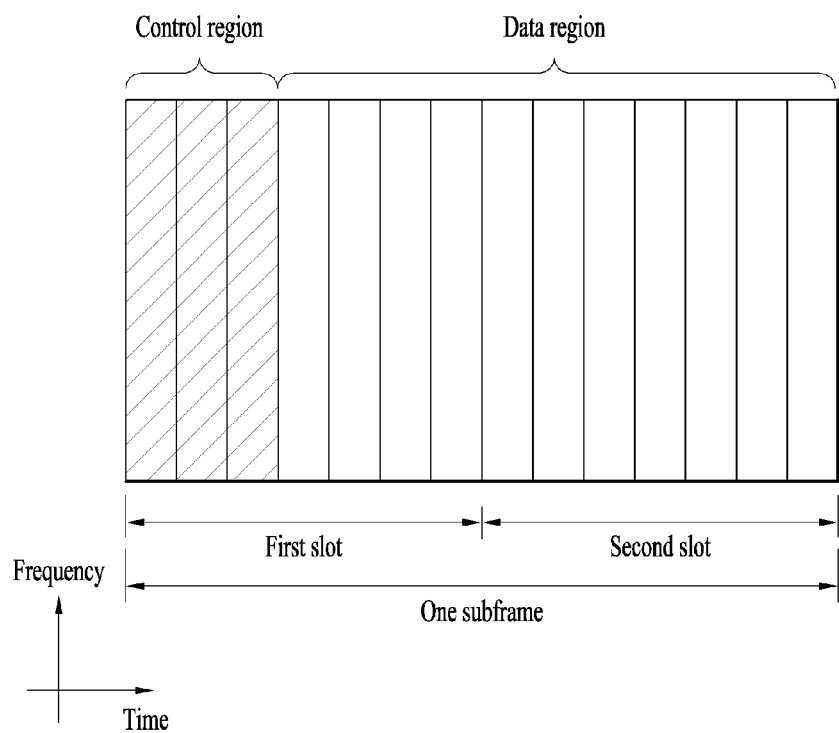
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a

TABLE 2

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $(2 + X) \cdot 2192 \cdot T_s$ | $(2 + X) \cdot 2560 \cdot T_s$ | $20480 \cdot T_s$ | $(2 + X) \cdot 2192 \cdot T_s$ | $(2 + X) \cdot 2560 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
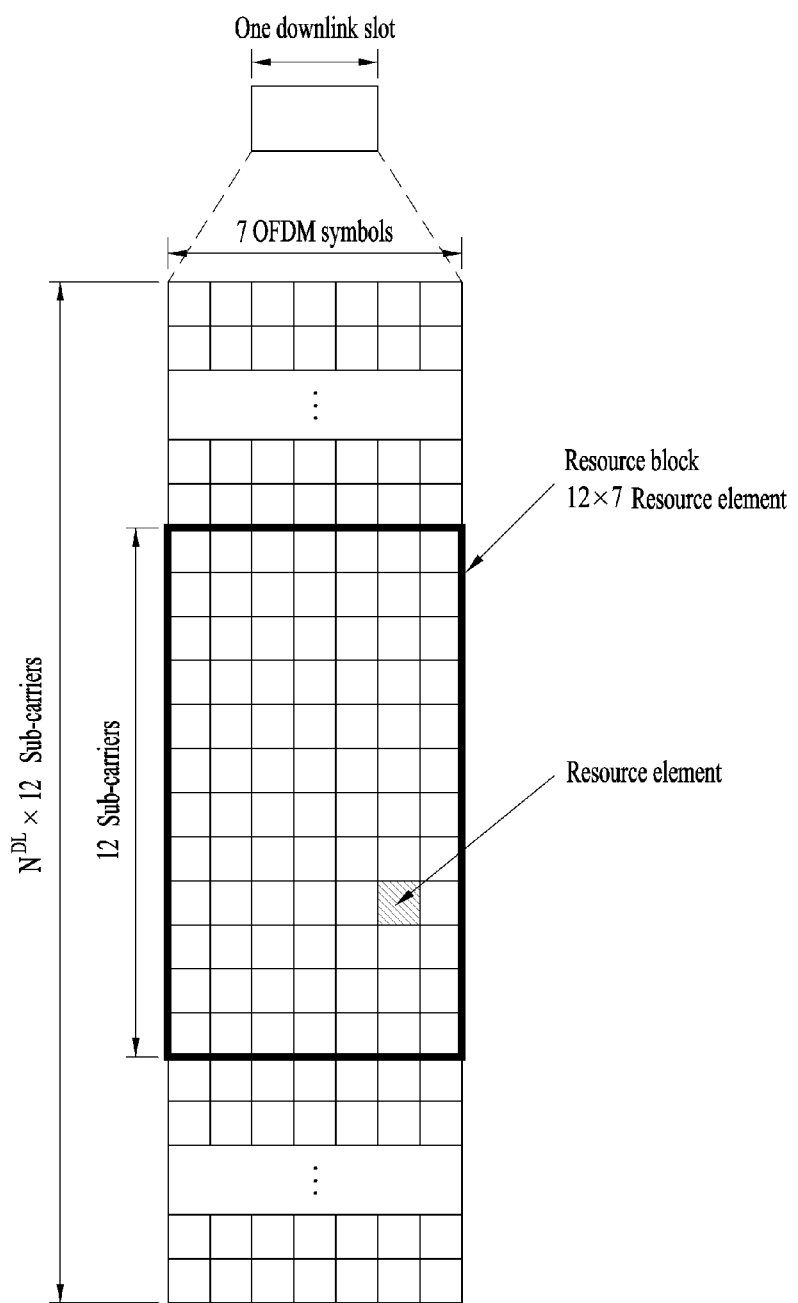
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of $\mu$ and cyclic prefix information per carrier bandwidth part can be signaled in DL and UL, respectively. For example, the value of $\mu$ and cyclic prefix information per downlink carrier bandwidth part may be signaled though DL-BWP-mu and DL-MWP-cp corresponding to higher layer signaling. As another example, the value of $\mu$ and cyclic prefix information per uplink carrier bandwidth part may be signaled though UL-BWP-mu and UL-MWP-cp corresponding to higher layer signaling.

TABLE 3

| $\mu$ | $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe, \mu} = N_{symb}^{slot} N_{slot}^{subframe, \mu}$.

In addition, each subframe may be composed of two half-frames with the same size. In this case, the two half-frames are composed of subframes 0 to 4 and subframes 5 to 9, respectively.

Regarding the subcarrier spacing $\mu$, slots may be numbered within one subframe in ascending order like $n_s^\mu \in \{0, \ldots, N_{slot}^{subframe, \mu}-1\}$ and may also be numbered within a frame in ascending order like $n_{s,f}^\mu \in \{0, \ldots, N_{slot}^{frame, \mu}-1\}$. In this case, the number of consecutive OFDM symbols in one slot ($N_{symb}^{slot}$) may be determined as shown in the following table according to the cyclic prefix. The start slot (s) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| $\mu$ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame, \mu}$ | $N_{slot}^{subframe, \mu}$ |
| --- | --- | --- | --- |
| 2 | 12 | 40 | 4 |

In the NR system to which the present invention can be applied, a self-contained slot structure can be applied based on the above-described slot structure.

Figure 6:
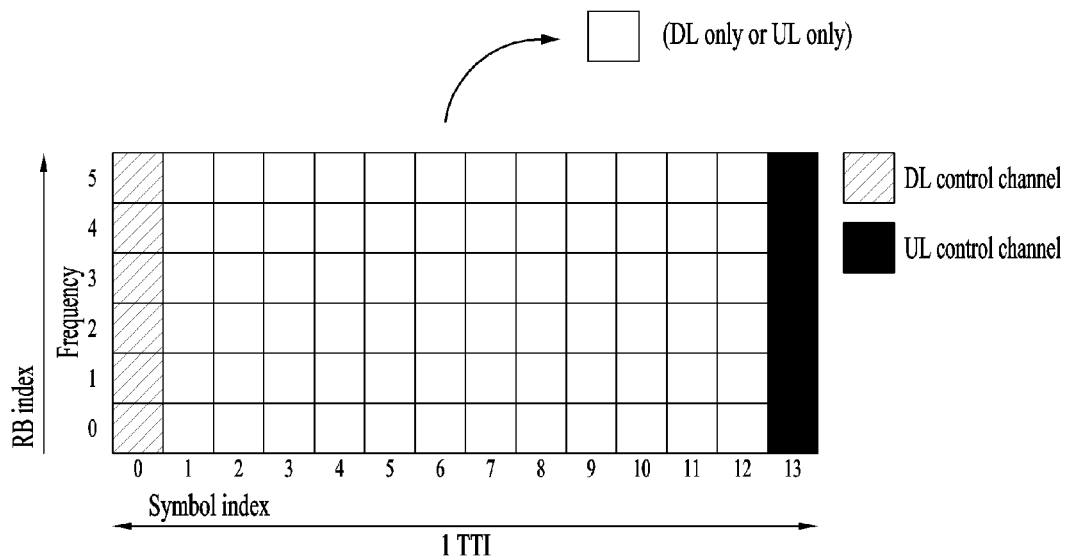
FIG. 6 is a diagram illustrating a self-contained slot structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
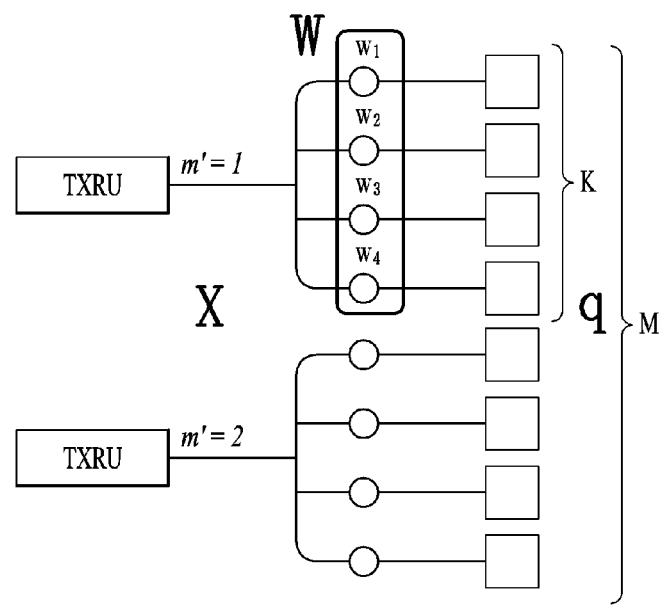
FIGS. 7 and 8 are diagrams illustrating representative connection methods for connecting TXRUs to antenna elements.
Figure 8:
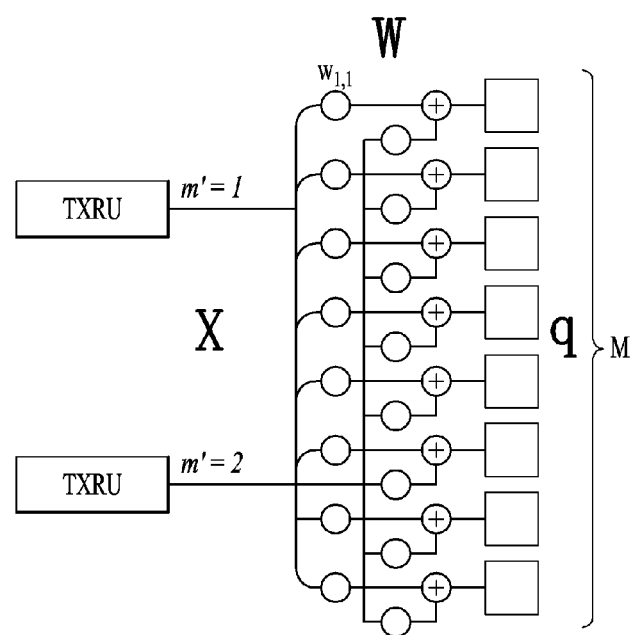

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method of connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
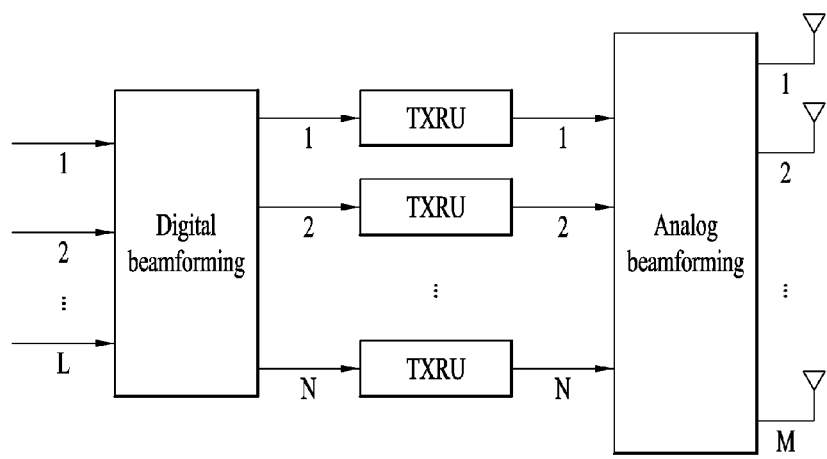
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
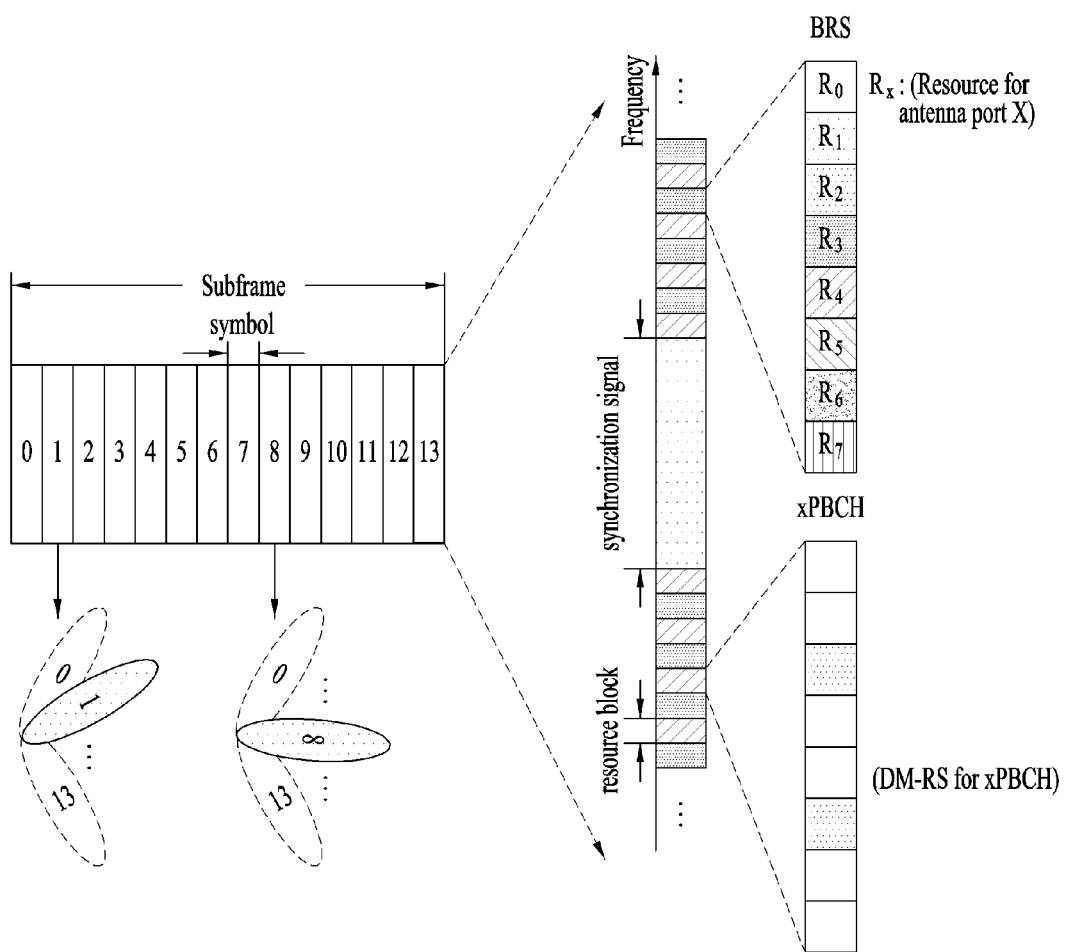
FIG. 10 is a diagram schematically illustrating the beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Licensed Assisted Access (LAA) System

Hereinafter, methods for transmitting and receiving data in a carrier aggregation environment of an NR or LTE band, which is a licensed band, and an unlicensed band will be described. In the embodiments of the present invention, the LAA system refers to a communication system (e.g., an LTE system or an NR system) that supports a CA situation of the licensed band and the unlicensed band. Here, as the unlicensed band, a WiFi band or a Bluetooth (BT) band may be used.

Here, LAA may refer to an LTE system or an NR system operating in an unlicensed band. LAA may also refer to a method for transmitting and receiving data in the unlicensed band in combination with the licensed band.

Figure 11:
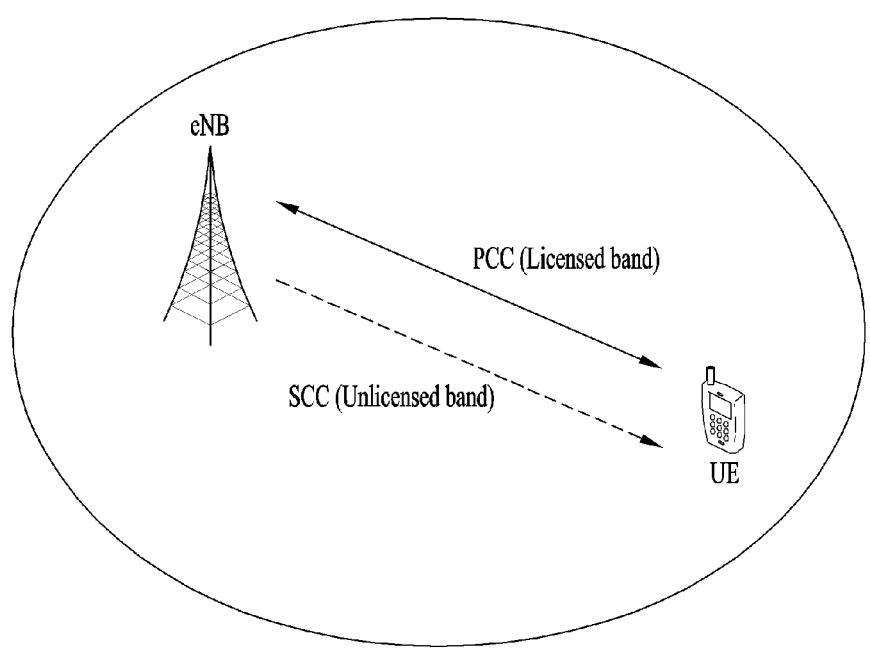
FIG. 11 is a diagram illustrating an example of a CA environment in a wireless communication system supporting an unlicensed band.

FIG. 11 is a diagram illustrating an example of a CA environment in a wireless communication system supporting an unlicensed band.

Hereinafter, for simplicity, it is assumed that the UE is configured to perform wireless communication in each of the licensed band and the unlicensed band using two component carriers (CCs). Of course, the following methods may be applied even when three or more CCs are configured for the UE.

In the embodiments of the present invention, it is assumed that a licensed CC (LCC) is a primary CC (which may be called a PCC or a PCell) and an unlicensed CC (UCC) is a secondary CC (which may be called a SCC or SCell). The embodiments of the present invention are also be applicable even to a situation in which multiple licensed bands and multiple unlicensed bands are used in a carrier aggregation manner. Further, the proposed schemes of the present invention are applicable not only to the 3GPP LTE system and the 3GPP NR system but also to systems having other characteristics.

FIG. 11 illustrates a case where one base station supports both the licensed band and the unlicensed band. That is, the UE may transmit/receive control information and data via a PCC, which is a licensed band, and also transmit/receive control information and data via the SCC, which is an unlicensed band. The situation shown in FIG. 11 is merely one example, and the embodiments of the present invention are applicable even to a CA environment where one UE accesses multiple base stations.

For example, the UE may configure a PCell with a macro base station (a Macro eNB (M-eNB) or a Macro gNB (M-gNB)), and may configure an SCell with a small base station (a Small eNB (S-eNB) or a Small gNB (S-gNB)). In this case, the macro base station and the small base station may be connected over a backhaul network.

In embodiments of the present invention, the unlicensed band may be operated according to a contention-based random access scheme. In this case, channel access procedures for LAA are performed as follows.

3.1. Downlink Channel Access Procedures

An eNB operating LAA Scell(s) (or an unlicensed band) shall perform the downlink channel access procedure (CAP) described below for cell(s) in which the LAA Scell(s) transmission(s) are performed.

3.1.1. Channel Access Procedure for Transmission(s) Including PDSCH/PDCCH/EPDCCH The eNB may transmit a transmission including PDSCH/PDCCH/EPDCCH on a carrier on which LAA Scell(s) transmission(s) are performed, after first sensing the channel to be idle during the slot durations of a defer durationTd; and after the counter N is zero in step 4 below. The counter N is adjusted by sensing the channel for additional slot duration(s) according to the steps below:

1) set N=$N_{init}$, where $N_{init}$ is a random number uniformly distributed between 0 and $CW_p$, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until a busy slot is detected in an additional defer duration $T_d$ or all the slots of the additional defer duration $T_d$ are detected to be idle;
6) if the channel is sensed to be idle during all the slot durations of the additional defer duration $T_d$, go to step 4; else, go to step 5.

The CAP for transmission including PDSCH/PDCCH/EPDCCH of the eNB described above may be summarized as follows.

Figure 12:
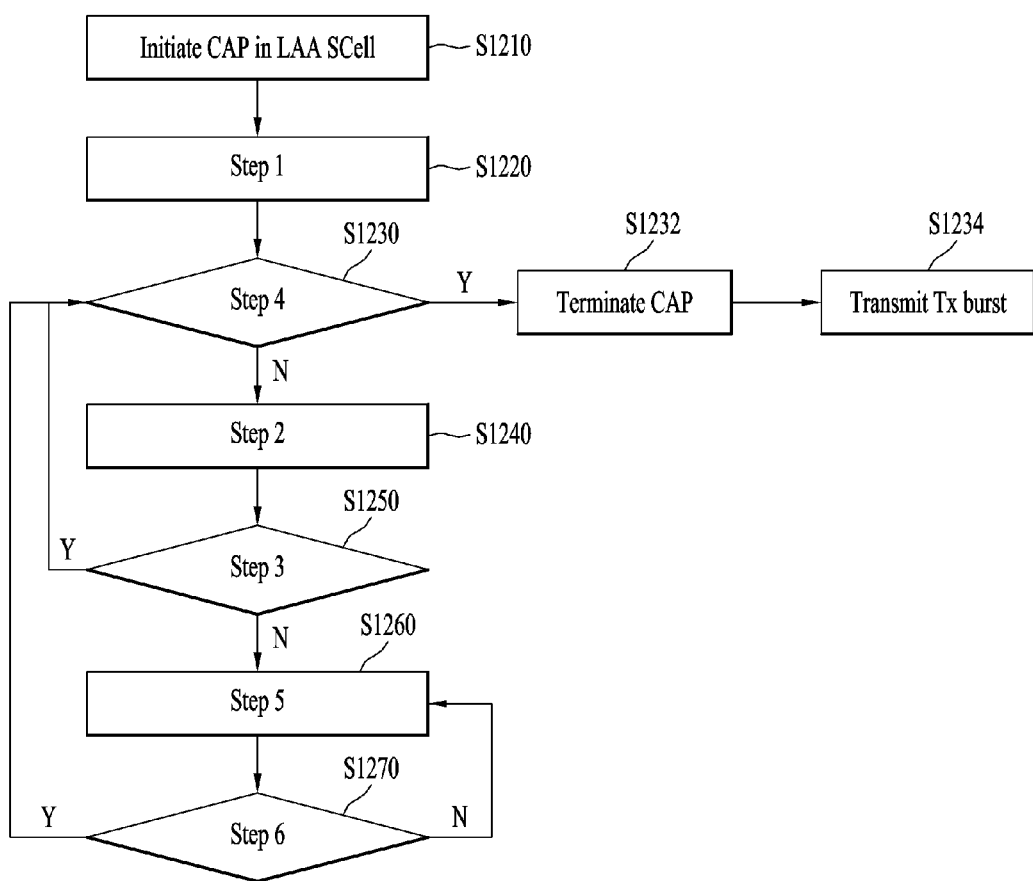
FIG. 12 is a diagram illustrating a CAP for unlicensed band transmission applicable to the present invention.

FIG. 12 is a diagram illustrating a CAP for unlicensed band transmission applicable to the present invention.

For a downlink transmission, a transmission node (e.g., an eNB) may initiate a channel access procedure (CAP) to operate in the LAA Scell(s), which are unlicensed band cells (S1210).

The eNB may randomly select a backoff counter N within the contention window CW according to step 1. At this time, N is set to an initial value $N_{init}$ (S1220). $N_{init}$ is selected as any value from among the values between 0 and $CW_p$.

Next, if the backoff counter value N is 0 in step 4 (S1230; Y), the eNB terminates the CAP (S1232). Then, the eNB may perform Tx burst transmission including PDSCH/PDCCH/EPDCCH (S1234). On the other hand, if the backoff counter value is not 0 (S1230; N), the eNB decrements the backoff counter value by 1 according to step 2 (S1240).

Then, the eNB checks whether the channel of the LAA SCell(s) is idle (S1250). If the channel is idle (S1250; Y), the base station checks whether the backoff counter value is 0 (S1230).

On the contrary, if the channel is not idle in operation S1250 (S1250; N), namely, if the channel is busy, the eNB checks whether the channel is idle during a defer duration $T_d$ (25 usec or more) longer than the slot time (e.g., 9 usec) (S1262). If the channel is idle during the defer duration (S1270; Y), the eNB may resume the CAP.

For example, when the backoff counter value Nina is 10 and it is determined that the channel is busy after the backoff counter value is decreased to 5, the eNB senses the channel during the defer duration to determine whether the channel is idle. If the channel is idle during the defer duration, the eNB may perform the CAP again from the backoff counter value 5 (or 4 after decrementing the backoff counter value by 1) instead of setting the backoff counter value $N_{init}$.

On the other hand, if the channel is busy during the defer duration (S1270; N), the eNB re-performs operation S1260 and checks again whether the channel is idle during a new defer duration.

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier if the following conditions are met:

the channel is sensed to be idle at least in a slot duration $T_{sl}$ when the eNB is ready to transmit PDSCH/PDCCH/EPDCCH; and the channel has been sensed to be idle during all the slot durations of a defer duration $T_d$ immediately before this transmission.

If the channel has not been sensed to be idle in a slot duration $T_{sl}$ when the eNB senses the channel after it is ready to transmit, or if the channel has been sensed to be not idle during any of the slot durations of a defer duration $T_d$ immediately before the intended transmission, the eNB proceeds to step 1 after sensing the channel to be idle during the slot durations of a defer duration $T_d$.

The defer duration $T_d$ consists of duration $T_f$ (=16 us) immediately followed by $m_p$ consecutive slot durations where each slot duration $T_{sl}$ is 9 us, and $T_f$ includes an idle slot duration $T_{sl}$ at the start of $T_f$.

A slot duration $T_{sl}$ is considered to be idle if the eNB senses the channel during the slot duration $T_{sl}$, and the power detected by the eNB for at least 4 us in the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in detail in sub clause 3.1.3.

$CW_{min,p}$ and $CW_{max,p}$ chosen before step 1 of the procedure above.

$m_p$, $CW_{min,p}$, and $CW_{max,p}$ are based on channel access priority class associated with the eNB transmission (see Table 6 below).

$X_{Thresh}$ is adjusted as described in sub clause 3.1.4.

TABLE 6

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the eNB transmits discovery signal transmission(s) not including PDSCH/PDCCH/EPDCCH when N>0 in the procedure above, the eNB shall not decrement the counter N during the slot duration(s) overlapping with the discovery signal transmission.

The eNB shall not perform continuous transmission on a carrier on which the LAA Scell(s) transmission(s) are performed, for a period exceeding $T_{mcot,p}$ as given in Table 6.

For p=3 and p=4 in Table 6, if the absence of any other technology sharing the carrier can be guaranteed on a long term basis (e.g., by level of regulation), $T_{mcot,p}$ is set to 10 ms. Otherwise, $T_{mcot,p}$ is set to 8 ms.

3.1.2. Channel Access Procedure for Transmissions Including Discovery Signal Transmission(s) and not Including PDSCH An eNB may transmit a transmission including discovery signal but not including PDSCH on a carrier on which LAA Scell(s) transmission(s) are performed immediately after sensing the channel to be idle for at least a sensing interval $T_{drs}$=25 us and if the duration of the transmission is less than 1 ms. Here, $T_{drs}$ consists of a duration $T_f$ (=16 us) immediately followed by one slot duration $T_{sl}$=9 us. $T_f$ includes an idle slot duration $T_{sl}$ at the start of $T_f$. The channel is considered to be idle for Tars, if it is sensed to be idle during the slot durations of $T_{drs}$.

3.1.3. Contention Window Adjustment Procedure

If the eNB transmits transmissions including PDSCH that are associated with channel access priority class p on a carrier, the eNB maintains the contention window value $CW_p$ and adjusts $CW_p$ before step 1 of the procedure (i.e., before the CAP) described in sub clause 3.1.1 for those transmissions using the following steps:

1> for every priority class p∈{1, 2, 3, 4}, set $CW_p=CW_{min,p}$;

2> if at least Z=80% of HARQ-ACK values corresponding to PDSCH transmission(s) in reference subframe k are determined as NACK, increase $CW_p$ for every priority class p∈{1, 2, 3, 4} to the next higher allowed value and remain in step 2; otherwise, go to step 1.

In other words, if the probability that the HARQ-ACK values corresponding to the PDSCH transmission(s) in reference subframe k are determined as NACK is at least 80%, the eNB increases the CW values set for each priority class to the next higher priority class. Alternatively, the eNB maintains the CW values set for each priority class as initial values.

Here, reference subframe k is the starting subframe of the most recent transmission on the carrier made by the eNB, for which at least some HARQ-ACK feedback is expected to be available.

The eNB shall adjust the value of $CW_p$ for every priority class p∈{1, 2, 3, 4} based on a given reference subframe k only once.

If $CW_p=CW_{max,p}$, the next higher allowed value for adjusting $CW_p$ is $CW_{max,p}$.

The probability Z that the HARQ-ACK values corresponding to PDSCH transmission(s) in reference subframe k are determined as NACK may be determined in consideration of the followings:

if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.

if the HARQ-ACK values correspond to PDSCH transmission(s) on an LAA SCell that are assigned by (E)PDCCH transmitted on the same LAA SCell, if no HARQ-ACK feedback is detected for a PDSCH transmission by the eNB, or if the eNB detects 'DTX', 'NACK/DTX' or 'any' state, it is counted as NACK.

if the HARQ-ACK values correspond to PDSCH transmission(s) on an LAA SCell that are assigned by (E)PDCCH transmitted on another LAA cell, if the HARQ-ACK feedback for a PDSCH transmission is detected by the eNB, 'NACK/DTX' or 'any' state is counted as NACK, and 'DTX' state is ignored.

if no HARQ-ACK feedback is detected for a PDSCH transmission by the eNB, if PUCCH format 1 with channel selection is expected to be used by the UE, 'NACK/DTX' state corresponding to 'no transmission' is counted as NACK, and 'DTX' state corresponding to 'no transmission' is ignored. Otherwise, the HARQ-ACK for the PDSCH transmission is ignored.

if a PDSCH transmission has two codewords, the HARQ-ACK value of each codeword is considered separately.

bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time to, the eNB maintains the contention window value $CW_p$ and adjusts $CW_p$ before step 1 of the procedure described in sub clause 3.1.1 for those transmissions (i.e., before performing the CAP) using the following steps:

1> for every priority class p∈{1, 2, 3, 4}, set $CW_p=CW_{min,p}$;

2> if less than 10% of the UL transport blocks scheduled by the eNB using Type 2 channel access procedure (described in sub clause 3.2.1.2) in the time interval between t0 and t0+T_CO have been received successfully, increase $CW_p$ for every priority class p∈{1, 2, 3, 4} to the next higher allowed value and remain in step 2; otherwise, go to step 1.

Here, $T_{CO}$ is calculated as described is computed as described in subclause 3.2.1.

If the $CW_p=CW_{max,p}$ is consecutively used K times for generation of $N_{init}$, $CW_p$ is reset to $CW_{min,p}$ only for that priority class $CW_p=CW_{max,p}$ for which is consecutively used K times for generation of $N_{init}$. K is selected by the eNB from the set of values {1, 2, . . . , 8} for each priority class p∈{1, 2, 3, 4}.

3.1.4. Energy Detection Threshold Adaptation Procedure

An eNB accessing a carrier on which LAA Scell(s) transmission(s) are performed, shall set the energy detection threshold ($X_{Thresh}$) to be less than or equal to the maximum energy detection threshold $X_{Thresh\_max}$.

The maximum energy detection threshold $X_{Thresh\_max}$ is determined as follows:

if the absence of any other technology sharing the carrier can be guaranteed on a long term basis (e.g., by level of regulation), then:

$$X_{Thresh\_max} = \min\begin{cases} T_{max} + 10 \text{ dB}, \\ X_r \end{cases}$$

where $X_r$ is the energy detection threshold defined by regulatory requirements in dBm when such requirements are defined, otherwise $X_r = T_{max}+10$ dB. Otherwise, $$X_{Thresh\_max} = \max\begin{cases} -72 + 10 \cdot \log10(BW_{MHz}/20 \text{ MHz})dBm, \\ \min\begin{cases} T_{max}, \\ T_{max} - T_A + (P_H + 10 \cdot \log10(BW_{MHz}/20 \text{ MHz}) - P_{TX}) \end{cases} \end{cases}$$

where each variable is defined as follows:
$T_A$=10 dB for transmission(s) including PDSCH;
$T_A$=5 dB for transmissions including discovery signal transmission(s) and not including PDSCH;
$P_H$=23 dBm;
$P_{TX}$ is the set maximum eNB output power in dBm for the carrier;
eNB uses the set maximum transmission power over a single carrier irrespective of whether single carrier or multi-carrier transmission is employed
$T_{max}$(dBm)=10·log 10(3.16228·10$^{-8}$ (mW/MHz) ·BW_{MHz} (MHz));
BW_{MHz} is the single carrier bandwidth in MHz.

3.1.5. Channel Access Procedure for Transmission(s) on Multiple Carriers

An eNB can access multiple carriers on which LAA Scell(s) transmission(s) are performed, according to one of the Type A or Type B procedures described below.

3.1.5.1. Type A Multi-Carrier Access Procedures

The eNB shall perform channel access on each carrier $C_i \in C$, according to the procedures described in this subclause, where C is a set of carriers on which the eNB intends to transmit, and i=0, 1, . . . q−1, and q is the number of carriers on which the eNB intends to transmit.

The counter N described in subclause 3.1.1 (i.e., the counter N considered in the CAP) is determined for each carrier c, and is denoted as $N_{c_i}$. $N_{c_i}$ is maintained according to subclause 3.1.5.1.1 or 3.1.5.1.2 below.

3.1.5.1.1. Type A1

Counter N as described in subclause 3.1.1 (i.e., the counter N considered in the CAP) is independently determined for each carrier c, and is denoted as $N_{c_i}$.

If the absence of any other technology sharing the carrier can be guaranteed on a long term basis (e.g., by level of regulation), when the eNB ceases transmission on any one carrier $c_j \in C$, for each carrier $c_i$ (where $c_i \neq c_j$), the eNB can resume decrementing $N_{c_i}$ when idle slots are detected either after waiting for a duration of $4 \cdot T_{sl}$, or after reinitialising $N_{c_i}$.

3.1.5.1.2. Type A2

Counter N is determined as described in subclause 3.1.1 for each carrier $c_j \in C$, and is denoted as $N_{c_i}$, where $c_j$ may be the carrier that has the largest $CW_p$ value. For each carrier $c_i$, $N_{c_i}=N_{c_j}$.

When the eNB ceases transmission on any one carrier for which $N_{c_i}$ is determined, the eNB shall reinitialise $N_{c_i}$ for all carriers.

3.1.5.2. Type B Multi-Carrier Access Procedure

A carrier $c_j \in C$ is selected by the eNB as follows:
the eNB selects $c_j$ by uniformly randomly choosing $c_j$ from C before each transmission on multiple carriers $c_i \in C$; or
the eNB selects $c_j$ no more frequently than once every 1 second,
where C is a set of carriers on which the eNB intends to transmit, i=0, 1, . . . q−1, and q is the number of carriers on which the eNB intends to transmit.

To transmit on carrier $c_j$, the eNB shall perform channel access on carrier $c_j$ according to the procedures described in subclause 3.1.1 with the modifications described in 3.1.5.2.1 or 3.1.5.2.2.

To transmit on carrier $c_i \neq c_j$, $c_i \in C$, for each carrier $c_i$, the eNB shall sense the carrier $c_i$ for at least a sensing interval $T_{mc}$=25 us immediately before the transmitting on carrier $c_j$. And the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.

The eNB shall not continuously transmit on a carrier $c_i \neq c_j$ (where $c_i \in C$) for a period exceeding $T_{mcot,p}$ as given in Table 6, where the value of $T_{mcot,p}$ is determined using the channel access parameters used for carrier $c_j$.

3.1.5.2.1. Type B1

A single $CW_p$ value is maintained for the set of carriers C.

For determining $CW_p$ for channel access on carrier $c_j$, step 2 of the procedure described in sub clause 3.1.3 is modified as follows:

if at least Z=80% of HARQ-ACK values corresponding to PDSCH transmission(s) in reference subframe k of all carriers $c_i \in C$ are determined as NACK, increase $CW_p$ for every priority class p∈{1, 2, 3, 4} to the next higher allowed value; otherwise, go to step 1.

3.1.5.2.2. Type B2

A $CW_p$ value is maintained independently for each carrier c, ∈ C using the procedure described in subclause 3.1.3. For determining $N_{init}$ for carrier $c_j$, $CW_p$ value of carrier $c_{j1} \in C$ is used, where $c_{j1}$ is the carrier with the largest $CW_p$ among all carriers in set C.

3.2. Uplink Channel Access Procedures

A UE and an eNB scheduling UL transmission(s) for the UE shall perform the procedures described below to access the channel(s) on which the LAA Scell(s) transmission(s) are performed.

3.2.1. Channel Access Procedure for Uplink Transmission (s)

The UE can access a carrier on which LAA Scell(s) UL transmission(s) are performed according to one of Type 1 or Type 2 UL channel access procedures. Type 1 channel access procedure is described in sub clause 3.2.1.1 below. Type 2 channel access procedure is described in sub clause 3.2.1.2 below.

If an UL grant scheduling a PUSCH transmission indicates Type 1 channel access procedure, the UE shall use Type 1 channel access procedure for transmitting transmissions including the PUSCH transmission unless stated otherwise in this sub clause.

If an UL grant scheduling a PUSCH transmission indicates Type 2 channel access procedure, the UE shall use Type 2 channel access procedure for transmitting transmissions including the PUSCH transmission unless stated otherwise in this sub clause.

The UE shall use Type 1 channel access procedure for SRS (Sounding Reference Signal) transmissions not including a PUSCH transmission. UL channel access priority class p=1 is used for SRS transmissions not including a PUSCH.

TABLE 7

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.

NOTE 2:
When $T_{ulmcot,p}$ = 6 ms it maybe increased to 8 ms by inserting one or more gaps. The minimum duration of a gap shall be 100 μs. The maximum duration before including any such gap shall be 6 ms.

If the 'UL configuration for LAA' field configures an 'UL offset' l and an 'UL duration' d for subframe n, then
the UE may use channel access Type 2 for transmissions in subframes n+l+i (where i=0, 1, ... d−1), if the end of UE transmission occurs in or before subframe n+l+d−1.

If the UE scheduled to transmit transmissions including PUSCH in a set of subframes $n_0, n_1, \ldots, n_{w-1}$ using PDCCH DCI format 0B/4B, and if the UE cannot access the channel for a transmission in subframe $n_k$, the UE shall attempt to make a transmission in subframe $n_{k+1}$ according to the channel access type indicated in the DCI, where k∈{0, 1, ... w−2}, and w is the number of scheduled subframes indicated in the DCI.

If the UE is scheduled to transmit transmissions without gaps including PUSCH in a set of subframes $n_0, n_1, \ldots, n_{w-1}$ using one or more PDCCH DCI format 0A/0B/4A/4B and the UE performs a transmission in subframe $n_k$ after accessing the carrier according to one of Type 1 or Type 2 channel access procedures, the UE may continue transmission in subframes after $n_k$ where k∈{0, 1, ... w−1}.

If the beginning of UE transmission in subframe n+1 immediately follows the end of UE transmission in subframe n, the UE is not expected to be indicated with different channel access types for the transmissions in those subframes.

If the UE is scheduled to perform transmission without gaps in subframes $n_0, n_1, \ldots, n_{w-1}$ using one or more PDCCH DCI format 0A/0B/4A/4B, and if the UE has stopped transmitting during or before subframe $n_{k1}$, where k1∈{0, 1, ... w−2}, and if the channel is sensed by the UE to be continuously idle after the UE has stopped transmitting, the UE may transmit in a later subframe $n_{k2}$, where k2∈{1, ... w−1}, using Type 2 channel access procedure. If the channel sensed by the UE is not continuously idle after the UE has stopped transmitting, the UE may transmit in a later subframe $n_{k2}$, where k2∈{1, ... w−1}, using Type 1 channel access procedure with the UL channel access priority class indicated in the DCI corresponding to subframe $n_{k2}$.

If the UE receives an UL grant and the DCI indicates a PUSCH transmission starting in subframe n using Type 1 channel access procedure, and if the UE has an ongoing Type 1 channel access procedure before subframe n:
  if the UL channel access priority class value $p_1$ used for the ongoing Type 1 channel access procedure is same or larger than the UL channel access priority class value $c_2$ indicated in the DCI, the UE may transmit the PUSCH transmission in response to the UL grant by accessing the carrier by using the ongoing Type 1 channel access procedure;
  if the UL channel access priority class value $p_1$ used for the ongoing Type 1 channel access procedure is smaller than the UL channel access priority class value $p_2$ indicated in the DCI, the UE shall terminate the ongoing channel access procedure.

If the UE is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, and if the carrier frequencies of the set of carriers C is a subset of one of the sets of predefined carrier frequencies,
  the UE may transmit on carrier $c_i$∈C using Type 2 channel access procedure.
    if Type 2 channel access procedure is performed on carrier $c_i$ immediately before the UE transmission on carrier $c_j$∈C, where i≠j, and
    if the UE has accessed carrier $c_j$ using Type 1 channel access procedure,
    carrier $c_j$ is selected by the UE uniformly randomly from the set of carriers C before performing Type 1 channel access procedure on any carrier in the set of carriers C.

A base station may indicate Type 2 channel access procedure in the DCI of an UL grant scheduling transmission(s) including PUSCH on a carrier in subframe n when the base station has transmitted on the carrier according to the channel access procedure described in clause 3.1.1.

Alternatively, a base station may indicate using the 'UL Configuration for LAA' field that the UE may perform a Type 2 channel access procedure for transmissions(s) including PUSCH on a carrier in subframe n when the base station has transmitted on the carrier according to the channel access procedure described in clause 3.1.1.

Alternatively, a base station may schedule transmissions including PUSCH on a carrier in subframe n, that follows a transmission by the base station on that carrier with a duration of $T_{short\_ul}$=25 us, if subframe n occurs within the time interval starting at $t_0$ and ending at $t_0+T_{CO}$, where $T_{CO}=T_{mcot,p}+T_g$, where each variable may be defined as follows:

$t_0$ is the time instant when the base station has started transmission;

$T_{mcot,p}$ is determined by the base station as described in clause 3.1;

$T_g$ is the total duration of all gaps of duration greater than 25 us that occur between the DL transmission of the base station and UL transmissions scheduled by the base station, and between any two UL transmissions scheduled by the base station starting from $t_0$.

The base station shall schedule UL transmissions between $t_0$ and $t_0+T_{CO}$ in contiguous subframes if they can be scheduled contiguously.

For an UL transmission on a carrier that follows a transmission by the base station on that carrier within a duration of $T_{short\_ul}$=25 us, the UE may use Type 2 channel access procedure for the UL transmission.

If the base station indicates Type 2 channel access procedure for the UE in the DCI, the base station indicates the channel access priority class used to obtain access to the channel in the DCI.

3.2.1.1. Type 1 UL Channel Access Procedure

The UE may perform the transmission using Type 1 channel access procedure after sensing the channel to be idle during the slot durations of a defer duration $T_d$; and after the counter N is zero in step 4. The counter N is adjusted by sensing the channel for additional slot duration(s) according to the steps described below:

1) set N=$N_{init}$, where $N_{init}$ is a random number uniformly distributed between 0 and $CW_p$, and go to step 4;
2) if N>0 and the UE chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5.

In brief, Type 1 UL CAP of the UE described above may be summarized as follows.

For uplink transmissions, a transmission node (e.g., a UE) may initiate a channel access procedure (CAP) to operate in the LAA Scell(s), which are unlicensed band cells (S1210).

The UE may randomly select a backoff counter N within the contention window CW according to step 1. At this time, N is set to an initial value $N_{init}$ (S1220). $N_{init}$ is selected as any value among the values between 0 and $CW_p$.

Next, if the backoff counter value N is 0 in step 4 (S1230; Y), the UE terminates the CAP (S1232). Then, the eNB may perform a Tx burst transmission (S1234). On the other hand, if the backoff counter value is not 0 (S1230; N), the UE decrements the backoff counter value by 1 according to step 2 (S1240).

Then, the UE checks whether the channel of the LAA SCell(s) is idle (S1250). If the channel is idle (S1250; Y), the base station checks whether the backoff counter value is 0 (S1230).

On the contrary, if the channel is not idle in operation S1250 (S1250; N), namely, if the channel is busy, the UE checks whether the channel is idle during a defer duration Id (25 usec or more) longer than the slot time (e.g., 9 usec) (S1262). If the channel is idle during the defer duration (S1270; Y), the UE may resume the CAP.

For example, when the backoff counter value $N_{init}$ is 10 and it is determined that the channel is busy after the backoff counter value is decreased to 5, the UE senses the channel during the defer duration to determine whether the channel is idle. If the channel is idle during the defer duration, the UE may perform the CAP again from the backoff counter value 5 (or from 4 after decrementing the backoff counter value by 1) instead of setting the backoff counter value On the other hand, if the channel is busy during the defer duration (S1270; N), the UE re-performs operation S1260 and checks again whether the channel is idle for a new defer duration.

If the UE has not transmitted a transmission including PUSCH on a carrier on which LAA Scell(s) transmission(s) are performed after step 4 in the procedure above, the UE may transmit a transmission including PUSCH on the carrier if the following conditions are met:

the channel is sensed to be idle at least in a slot duration $T_{sl}$ when the UE is ready to transmit the transmission including PUSCH; and the channel has been sensed to be idle during all the slot durations of a defer duration $T_d$ immediately before the transmission including PUSCH.

On the other hand, if the channel has not been sensed to be idle in a slot duration $T_{sl}$ when the UE first senses the channel after it is ready to transmit, or if the channel has not been sensed to be idle during any of the slot durations of a defer duration $T_d$ immediately before the intended transmission including PUSCH, the UE proceeds to step 1 after sensing the channel to be idle during the slot durations of a defer duration $T_d$.

The defer duration $T_d$ consists of duration $T_f$ (=16 us) immediately followed by $m_p$ consecutive slot durations where each slot duration $T_{sl}$ is 9 us, and $T_f$ includes an idle slot duration $T_{sl}$ at the start of $T_f$.

A slot duration $T_{sl}$ is considered to be idle if the UE senses the channel during the slot duration, and the power detected by the UE for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in detail in sub clause 3.2.2.

$CW_{min,p}$ and $CW_{max,p}$ and chosen before step 1 of the procedure above.

$m_p$, $CW_{min,p}$, and $CW_{max,p}$ are based on channel access priority class signaled to the UE (see Table 7).

$X_{Thresh}$ is adjusted as described in sub clause 3.2.3.

3.2.1.2. Type 2 UL Channel Access Procedure

If the UL uses Type 2 channel access procedure for a transmission including PUSCH, the UE may transmit the transmission including PUSCH immediately after sensing the channel to be idle for at least a sensing interval $T_{short\_ul}$=25 us. $T_{short\_u}$ consists of a duration $T_f$=16 us immediately followed by one slot duration $T_{sl}$=9 us and $T_f$ includes an idle slot duration $T_{sl}$ at the start of $T_f$. The channel is considered to be idle for $T_{short\_ul}$ if it is sensed to be idle during the slot durations of $T_{short\_ul}$.

3.2.2. Contention Window Adjustment Procedure

If the UE transmits transmissions using Type 1 channel access procedure that are associated with channel access priority class p on a carrier, the UE maintains the contention window value $CW_P$ and adjusts $CW_P$ for those transmissions before step 1 of the procedure described in sub clause 3.2.1.1 (i.e., before performing the CAP), using the following procedure:

if a NDI (New Data Indicator) value for at least one HARQ process associated with HARQ_ID_ref is toggled,
for every priority class $p \in \{1,2,3,4\}$, set $CW_p = CW_{min,p}$;
otherwise, increase $CW_p$ for every priority class $p \in \{1, 2, 3, 4\}$ to the next higher allowed value.

Here, HARQ_ID_ref is the HARQ process ID of UL-SCH in reference subframe $n_{ref}$. The reference subframe $n_{ref}$ is determined as follows:

If the UE receives a UL grant in subframe $n_g$, subframe $n_w$ is the most recent subframe before subframe $n_g$-3 in which the UE has transmitted UL-SCH using Type 1 channel access procedure:
  If the UE transmits transmissions including UL-SCH without gaps starting with subframe no and in subframes $n_0, n_1, \ldots, n_w$, reference subframe $n_{ref}$ is subframe $n_0$;
  otherwise, reference subframe $n_{ref}$ is subframe $n_w$.

The UE may keep the value of $CW_p$ unchanged for every priority class $p \in \{1, 2, 3, 4\}$, if the UE scheduled to transmit transmissions without gaps including PUSCH in a set of subframes $n_0, n_1, \ldots, n_{w-1}$ using Type 1 channel access procedure, and if the UE is not able to transmit any transmission including PUSCH in the set of subframes.

The UE may keep the value of $CW_p$ for every priority class $p \in \{1, 2, 3, 4\}$ the same as that for the last scheduled transmission including PUSCH using Type 1 channel access procedure, if the reference subframe for the last scheduled transmission is also $n_{ref}$.

If $CW_p = CW_{max,p}$, the next higher allowed value for adjusting $CW_p$ is $CW_{max,p}$.

If the $CW_p = CW_{max,p}$ is consecutively used K times for generation of $N_{init}$, $CW_p$ is reset to $CW_{min,p}$ only for that priority class p for which is consecutively used K times for generation of $N_{init}$. K is selected by the UE from the set of values $\{1, 2, \ldots, 8\}$ for each priority class $p \in \{1, 2, 3, 4\}$.

3.2.3. Energy Detection Threshold Adaptation Procedure

A UE accessing a carrier on which LAA Scell(s) transmission(s) are performed, shall set the energy detection threshold ($X_{Thresh}$) to be less than or equal to the maximum energy detection threshold $X_{Thresh\_max}$.

The maximum energy detection threshold $X_{Thresh\_max}$ is determined as follows:
if the UE is configured with higher layer parameter 'maxEnergyDetectionThreshold-r14',
  $X_{Thresh\_max}$ is set equal to the value signaled by the higher layer parameter;
otherwise,
  the UE shall determine $X'_{Thresh\_max}$ according to the procedure described in sub clause 3.2.3.1;
  if the UE is configured with higher layer parameter 'energyDetectionThresholdOffset-r14',
    $X_{Thresh\_max}$ is set by adjusting $X'_{Thresh\_max}$ according to the offset value signaled by the higher layer parameter;
  otherwise,
    the UE shall set to $X_{Thresh-max} = X'_{Thresh\_max}$.

3.2.3.1. Default Maximum Energy Detection Threshold Computation Procedure

If the higher layer parameter 'absenceOfAnyOtherTechnology-r14' indicates TRUE:

$$X'_{Thresh\_max} = \min\left\{ \begin{array}{l} T_{max} + 10 \text{ dB}, \\ X_r \end{array} \right\},$$

where $X_r$ is the maximum energy detection threshold defined by regulatory requirements in dBm when such requirements are defined, otherwise $X_r = T_{max} + 10$ dB;
otherwise, $$X'_{Thresh\_max} = \max\left\{ \begin{array}{l} -72 + 10 \cdot \log 10(BWMHz/20 \text{ MHz})\text{dBm}, \\ \min\left\{ \begin{array}{l} T_{max}, \\ T_{max} - T_A + (P_H + 10 \cdot \log 10(BWMHz/20 \text{ MHz}) - P_{TX}) \end{array} \right\} \end{array} \right\},$$

where each variable is defined as follows:
$T_A = 10$ dB
$P_H = 23$ dBm;
$P_{Tx}$ is the set to the value of $P_{CMAX\_H,c}$ as defined in 3GPP TS 36.101.
$T_{max}$(dBm)=10·log 10(3.16228·10$^{-8}$ (mW/MHz)· BWMHz (MHz))
BWMHz is the single carrier bandwidth in MHz.

3.3. Sub-Frame Structure Applicable to LAA System

Figure 13:
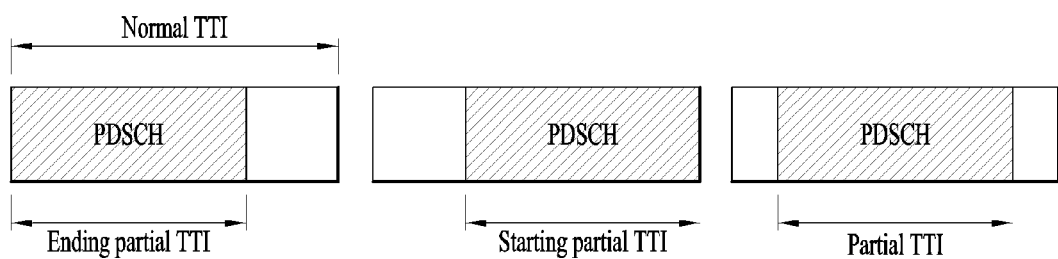
FIG. 13 is a diagram illustrating a partial TTI or a partial subframe applicable to the present invention.

FIG. 13 is a diagram illustrating a partial TTI or a partial subframe applicable to the present invention.

In the Release-13 LAA system, a partial TTI defined as DwPTS to make the most use of MCOT and support continuous transmission in transmitting a DL transmission burst is defined. The partial TTI (or partial subframe) refers to an interval in which a signal is transmitted only by a length less than the conventional TTI (e.g., 1 ms) in transmitting PDSCH.

In the present invention, for simplicity, a starting partial TTI or a starting partial subframe refers to a subframe in which some symbols in the head part are left blank, and an ending partial TTI or an ending partial subframe refers to a subframe in which some symbols in the tail part are left blank (whereas a complete TTI is called a normal TTI or a full TTI).

FIG. 13 is a diagram illustrating various forms of the partial TTI described above. In FIG. 13, the first block represents an ending partial TTI (or subframe), and the second block represents a starting partial TTI (or subframe). The third block of FIG. 13 represents a partial TTI (or subframe) having some symbols in the head and tail parts of a subframe left blank. Here, a time interval having no signal transmission in a normal TTI is called a transmission gap (TX gap).

While FIG. 13 is based on the DL operation, the illustrated structure also applicable to the UL operation in the same manner. For example, the partial TTI structure shown in FIG. 13 is applicable to PUCCH and/or PUSCH transmission.

4. Proposed Embodiments

Hereinafter, configurations proposed in the present invention will be described in detail based on the technical idea disclosed above.

As more and more communication devices require a greater communication capacity, efficient utilization of limited frequency bands in the wireless communication systems is increasingly becoming an important requirement. In this regard, cellular communication systems such as 3GPP LTE/NR systems support methods to utilize unlicensed bands such as the 2.4 GHz band, which has been used mostly by the legacy WiFi systems, and unlicensed bands such as the 5 GHz and 60 GHz bands, which which are recently drawn attention, for traffic off-loading.

As described above, in the unlicensed band, it is basically assumed that wireless transmission and reception is performed through contention between communication nodes. Accordingly, each communication node is required to check if no other communication node transmits a signal on the channel by performing channel sensing before transmitting a signal.

This operation is called a listen-before-talk (LBT) procedure or a channel access procedure (CAP). In particular, the operation of checking whether other communication nodes perform signal transmission is referred to as carrier sensing (CS). When it is determined through the CS that no other communication node performs signal transmission, it is defined that clear channel assessment (CCA) has been confirmed.

A base station or a UE of an LTE/NR system to which the present invention is applicable is required to perform the LBT or CAP for signal transmission in an unlicensed band (hereinafter referred to as a U-band). In addition, when the base station or the UE of the LTE/NR system transmits a signal, other communication nodes such as WiFi nodes should cause interference by performing the LBT or CAP. For example, in the WiFi standard (801.11ac), the CCA threshold is specified as −62 dBm for non-WiFi signals and −82 dBm for WiFi signals. Therefore, the STA or the AP may not perform signal transmission in order not to cause interference when signals except for WiFi signals are received at the power of −62 dBm or more.

According to the present invention, for UL data transmission of the UE in the U-band, the base station should succeed in the CAP (or LBT) for UL grant transmission in the U-band and the UE should also succeed in the CAP (or LBT) for UL data transmission. That is, the UE can attempt UL data transmission only when both the base station and the UE succeed in the CAP (or the LBT).

In addition, in the LTE system, a delay of at least 4 msec is taken between the UL grant and the scheduled UL data. Accordingly, when another transmission node coexisting in the U-band for the corresponding time period (e.g., delay time) obtains an access first, the scheduled UL data transmission may be delayed. For this reason, various methods to increase the efficiency of UL data transmission in the U-band are being discussed.

In this regard, in the present invention, an autonomous UL transmission (hereinafter referred to as an auto_Tx or AUL transmission) method for transmitting UL data without an UL grant will be described in detail. More specifically, the present invention provides a detailed description of an activation and/or release method, CAP (or LBT) methods, transmit power control methods, and the like for AUL transmission.

4.1. AUL Transmission Activation and/or Release Method

In configuring an AUL transmission in the U-band according to the present invention, the base station may preconfigure some information (e.g., a part or the entirety of periodicity, the number of subframes (SFs) valid for AUL transmission within a period, DM-RS sequence information, modulation and coding scheme information, and a HARQ process index) by RRC and/or higher layer signaling as in the case of LTE semi-persistent scheduling (SPS), and may activate/or deactivate (or release) the AUL transmission by first layer ((L 1) signaling (e.g., DCI).

Figure 14:
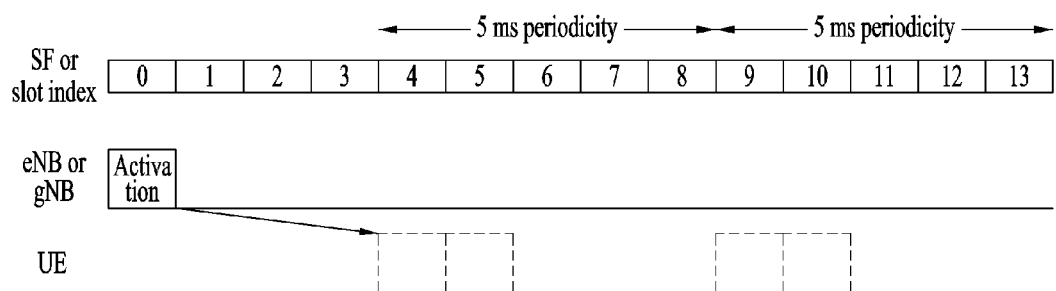
FIG. 14 is a diagram schematically illustrating an AUL transmission operation of a UE according to the present invention.

FIG. 14 is a diagram schematically illustrating an AUL transmission operation of a UE according to the present invention.

As shown in FIG. 14, if the base station has performed activation of AUL transmission in SF #0 (or Slot #0, hereinafter relevant elements are all referred to as SF #N for simplicity, wherein SF #N may be interpreted as Slot #N), the UE receiving the corresponding information may recognize SFs for the AUL transmission based on the 5 ms periodicity and the 2 ms duration, which are a preset periodicity and a preset duration, from SF #4. Then, when the UE performs and succeeds in the LBT (or CAP) for the SFs, the UE may attempt UL transmission without an additional UL grant.

Here, the duration information may be dynamically configured by L1 signaling. Alternatively, the duration information may be dynamically configured by dynamically configuring, by L1 signaling, a maximum number of SFs in which transmission is allowed within a duration preset by RRC signaling.

Here, there may be a restriction that the set duration cannot be set to be longer than the period (or period-k SFs or ms). For example, if the period is 5 ms (or 5 SFs), the maximum duration that can be set may be 5-k SFs or ms (e.g., k=1).

The number of HARQ process indexes available for AUL transmission may also be set. Here, it may be necessary to apply a restriction that the number of HARQ process indexes available for the AUL transmission should be larger than the maximum number of SFs in which transmission is allowed within the period. For example, it is assumed that the maximum number of SFs in which transmission is allowed within a specific period is two and the number of HARQ process indexes for AUL transmission is one. In this case, the UE may transmit a plurality of SFs having the same HARQ process index within the period, and accordingly the HARQ procedure may not operate efficiently.

For reference, DCI that activates and/or releases SPS in the legacy LTE system uses the same format as the conventional DCI scheduling DL and UL data, but is differentiated by cyclic redundancy check (CRC) masking with different radio network temporary identifiers (RNTIs). That is, the UE may identify whether the DCI is DCI indicating activation and/or release of the SPS, based on the different CRC-masked RNTIs. In other words, when CRC checking is performed by the SPS-C-RNTI, the UE may recognize that the DCI is intended for SPS.

Table 8 below shows 'special fields for semi-persistent scheduling activation PDCCH/EPDCCH validation' and Table 9 shows 'special fields for semi-persistent scheduling release PDCCH/EPDCCH validation'.

Additionally, the UE may validate whether the corresponding PDCCH/EPDCCH is intended for SPS activation and/or release, by presetting the value of a specific field according to the DCI formats as shown in the tables below. In addition, the new data indicator (NDI) is fixed to '0' in the DCI for use in SPS activation and/or release. The NDI field may also be used for validation.

TABLE 8

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' if present | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD. set to '0000' |
| Modulation and coding scheme | N/A | MSB is set to '0' | For the enabled transport block: MSB is set to '0' |
| Redundancy version | N/A | set to '00' | For the enabled transport block: set to '00' |

TABLE 9

|  | DCI format 0 | DCI format 1A |
|---|---|---|
| TPC command for scheduled PUSCH | set to '00' | N/A |
| Cyclic shift DM RS | set to '000' if present | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

In the Rel-14 LTE system, a new DCI format for UL scheduling in an LAA SCell has been introduced in place of the conventional DCI formats 0/4.

More specifically, DCI formats 0A/0B are utilized for UL scheduling (in the LAA SCell) of a UE for which transmission mode 1 (TM1) or transmission of one transport block (TB) or one codeword (CW) is configured, and DCI formats 4A/4B are utilized for UL scheduling (in the LAA SCell) of the UE for which TM2 or transmission of 2 TBs or 2 CWs is configured. Here, DCI formats 0A/4A are DCI formats capable of scheduling only a single SF and DCI formats 0B/4B are DCI formats capable of scheduling multiple SFs (e.g., one or more SFs).

Here, the following fields are newly introduced to DCI formats 0A/0B/4A/4B compared to the conventional DCI formats.

PUSCH trigger A: This field has value '0' for non-triggered scheduling and value '1' for triggered scheduling, wherein the triggered scheduling refers to a scheduling scheme in which the PUSCH timing is not actually indicated through the corresponding DCI, but is determined by a separately transmitted common PDCCH.

Timing offset: This field has a 4-bit-width. The field may indicate a PUSCH timing offset from SF #n+4 to SF #n+19.

HARQ process number: This number is also signaled in a UL grant according to introduction of asynchronous HARQ.

Redundancy version: This is also signaled in a UL grant due to introduction of asynchronous HARQ.

PUSCH starting position: This field may signal the slot #0 boundary, the slot #1 boundary and a point between the boundaries of slot #0 and slot #1 as a PUSCH starting position. In general, the field may indicate a starting time of the PUSCH region (e.g., a specific time between symbol indexes or symbol boundaries) in a corresponding SF (or slot).

PUSCH ending position: This field may signal whether to leave the last symbol blank in PUSCH transmission. In general, the field may indicate an ending time of the PUSCH region (e.g., a specific time between symbol indexes or symbol boundaries) in a corresponding SF (or slot).

Channel access type: This field indicates one of the types of channel access procedures allowed in the U-band. For example, the field may indicate one of type 1 channel access based on a random backoff or type 2 channel access for determining the idle/busy state by performing CCA only for a certain time.

Channel access priority class: This field indicates one of four channel access priority classes. The information indicated by the field may be used in setting a defer period and a CWS.

Number of scheduled SFs: This field is present in Multi-SF (or multi-slot) scheduling DCI (e.g., DCI format 0B/4B). The field may indicate the number of actually scheduled SFs that is less than or equal to a preset maximum number of schedulable SFs (e.g., one of the values from 2 to 4 is set by RRC signalling).

Configurations proposed in the present invention based on the technical contents above are described below.

4.1.1. AUL Transmission Validation Method

The fields (e.g., TPC (Transmission Power Control), DMRS CS value, MCS, resource allocation) in DCI format 0A/0B/4A/4B which are identical to those of the conventional DCI format 0/4 may be used for validation of activation and/or release of AUL transmission in the same manner as for the conventional SPS activation and/or release. Additionally, the newly added fields described above may also be utilized for validation of activation and/or release for AUL transmission as described in the proposals (or part of the proposals) below.

PUSCH trigger A: This field may be fixed to '0' (for validation of activation and/or release of AUL transmission), assuming that AUL transmission is generally scheduled by non-triggered scheduling.

Timing offset: PUSCH timing for AUL transmission may be set by an RRC configuration, and accordingly the field may be fixed to a specific value (e.g., '0000' or '1111') (for validation of activation and/or release of AUL transmission).

HARQ process number: This field may be fixed to '0000' (for validation of activation and/or release for AUL transmission), similarly to DL SPS. Alternatively, the field may be used to signal the number and/or range of HARQ process indexes to be configured for AUL transmission. In this case, the field may not be used for validation of activation. For example, when the field indicating the HARQ process number indicates 4, the number of HARQ process indexes configured for AUL transmission may be 4, and HARQ process indexes N/N+1/N+2/N+3 may be actually configured for AUL transmission by the preset HARQ process index starting value N.

Redundancy version: This field may be fixed to '00' (for validation of activation and/or release of AUL transmission), similarly to DL SPS. Alternatively, when the field is configured in I-bit per SF as in the case of DCI format 0B/4B, 1-bit information per SF may be fixed to '0' (for validation of activation and/or release of AUL transmission).

PUSCH starting position: The PUSCH starting position for AUL transmission may be set by the RRC configuration or be predefined. Thus, the field may be fixed to a specific value (e.g., '00') (for validation of activation and/or release of AUL transmission).

PUSCH ending position: The PUSCH ending position for AUL transmission may be set by the RRC configuration or be predefined. Thus, the field may be fixed to a specific value (e.g., '0' or '1') (for validation of activation and/or release of AUL transmission).

Channel access type: Basically, not all AUL transmissions can be included within the channel occupancy time (COT) of the eNB. Accordingly, type 1 channel access may be configured as a default channel access procedure. Thus, the field may be fixed to '0' (for validation of activation and/or release of AUL transmission).

Channel access priority class: One of the four channel access priority classes may be configured by the RRC configuration or be predefined. Thus, the field may be fixed to a specific value (e.g., '00' or '11') (for validation of activation and/or release of AUL transmission).

Number of scheduled SFs: The number of SFs (or slots) allowed for AUL transmission within a specific period may be set by the RRC configuration or be predefined. Thus, the field may be fixed to a specific value (e.g., '0' or '00') (for validation of activation and/or release of AUL transmission).

Additionally, the field for triggering an aperiodic SRS may also be fixed to a specific value (e.g., '0' or '00') (for validation of activation and/or release of AUL transmission).

As an example applicable to the present invention, HARQ feedback of the base station corresponding to AUL transmission may be introduced, and DCI newly defined for the HARQ feedback (hereinafter referred to as HARQ DCI for simplicity) and (de)activation DCI for AUL transmission may be defined to have an identical size (to reduce the number of times of blind decoding (BD) of the UE). As a specific example, the HARQ DCI and the (de)activation DCI for AUL transmission may be defined to have the same size as DCI format 0A (or another DCI format).

In this case, the UE may distinguish between the two DCIs (the HARQ DCI and the (de)activation DCI for AUL transmission) by separate RNTIs allocated to the two DCIs. Alternatively, the UE may distinguish between the two DCIs based on an indication of one of specific fields (e.g., PUSCH trigger A, Timing offset, HARQ process number, Redundancy version, PUSCH starting position, PUSCH ending position, Channel access type, Channel access priority class, a field for triggering aperiodic SRS) in the two DCIs. For example, to distinguish between the two DCIs, a specific state of a specific field in the DCIs may indicate the HARQ DCI, and the other specific state thereof may indicate the (de)activation DCI for AUL transmission. As a specific example, the 'channel access type' field may indicate the HARQ DCI when the value of the field is '0', and indicate the (de)activation DCI for AUL transmission when the value of the field is '1'. Alternatively, another field may indicate the HARQ DCI when the value of the field is '0', and indicate the (de)activation DCI for AUL transmission when the value of the field is '1'.

In addition, it may be necessary to identify whether the (de)activation DCI is activation DCI or deactivation DCI.

To this end, whether the DCI is deactivation DCI may be indicated by a specific state which is not utilized for RB-interlace allocation.

Alternatively, whether the DCI is activation DCI or deactivation DCI may be identify based on the value indicated by one of the fields (e.g., PUSCH trigger A, Timing offset, HARQ process number, Redundancy version, PUSCH starting position, PUSCH ending position, Channel access type, Channel access priority class, the field for triggering aperiodic SRS). For example, the 'PUSCH ending position' field may indicate activation DCI when the value of the field is '0', and indicate deactivation DCI when the value of the field is '1'. Alternatively, another field may indicate activation DCI when the value of the field is '0', and indicate deactivation DCI when the value of the field is '1'.

Alternatively, whether the DCI is HARQ DCI/activation DCI/deactivation DCI may be identified based on the value of one of the fields (e.g., PUSCH trigger A, Timing offset, HARQ process number, Redundancy version, PUSCH starting position, PUSCH ending position, Channel access type, Channel access priority class, the field for triggering aperiodic SRS). For example, a 2-bit field indicating the channel access priority class may be used. The field may indicate that the DCI is HARQ DCI when the value thereof is '00', and indicate that the DCI is deactivation DCI when the value thereof is '10'. Alternatively, another field may indicate activation DCI when the value of the field is '0', and indicate deactivation DCI when the value of the field is '1'.

Alternatively, whether the DCI is HARQ DCI/activation DCI/deactivation DCI may be identified by configuring a new 2-bit format indicator field while maintaining the same size as one of the conventional DCI formats 0A/0B/4A/4B. For example, the 2-bit format indicator field may indicate HARQ DCI when the value of the field is '00', indicate activation DCI when the value of the field is '01', and indicate deactivation DCI when the value of the field is '10'.

As another example applicable to the present invention, not only HARQ feedback information of the base station corresponding to the AUL transmission but also an MCS (and precoding matrix indicator (PMI)) value may be indicated in the HARQ DCI.

In this case, whether the MCS (and PMI) is carried in the HARQ DCI (and whether the MCS and/or the PMI are signaled for each HARQ process index) may be separately configured.

Alternatively, when it is assumed that the HARQ DCI maintains the same size as at least one of the conventional DCI format 0A/0B/4A/4B (hereinafter referred to as DCI format X for simplicity), whether the MCS (and PMI) is carried in the HARQ DCI may be determined by the number of HARQ process indexes allocated to AUL transmission and whether UL MIMO is supported. That is, if the number of HARQ process indexes is greater than or equal to a specific (preset) number, or TM2 (or 2-TB) transmission is configured for the UE, HARQ feedback alone may be sufficient for HARQ DCI configuration. Accordingly, in this case, the MCS (and PMI) may be configured not to be carried in the HARQ DCI. On the other hand, if the number of HARQ process indexes is less than the specific (preset) number, or TM2 (or 2-TB) transmission is configured for the UE, information that is substantially included in the DCI may be sufficiently smaller in size than DCI format X even if the MCS (and PMI) as well as HARQ feedback is included in the DCI. In this case, the MCS (and PMI) may be configured to be carried in the HARQ DCI.

When the MCS (and PMI) information is included in the HARQ DCI, the MCS (and PMI) information included in the HARQ DCI received in SF #n may basically be applied to all HARQ process indexes configured for AUL transmission after SF #n+k (e.g., k=4). However, for an HARQ process index which has not been flushed from the TX buffer (or for which retransmission is ongoing) by the time of SF #n (or SF #n+k), the UE may not update the MCS (and PMI) information received in SF #n until the TX buffer is flushed. This is because the RB-interlace allocation information is changed by the activation DCI, and the transport block size (TBS) may be changed if only the MCS is changed for the fixed number of RBs. Alternatively, for an HARQ process index that has not been flushed from the TX buffer (or for which retransmission is ongoing) by the time of SF #n (or SF #n+k), the UE may update and retransmit only the modulation order corresponding to the signaled MCS while maintaining the TBS in the MCS information received in SF #n until the TX buffer is flushed.

The above-described various methods are configured for AUL transmission, but they may also be applied to HARQ process indexes for which (re)transmission is indicated through a UL grant. That is, for an HARQ process index which has been configured for AUL transmission but for which (re)transmission has been instructed through the UL grant, the UE may not update the MCS (and PMI) information received in SF #n until SF #n (or SF #n+k). Alternatively, for an HARQ process index which has been configured for AUL transmission by the time of SF #n (or SF #n+k) but for which (re)transmission is instructed through the UL grant, the UE may update only the modulation order corresponding to the signaled MCS and attempt retransmission while maintaining the TBS in the MCS information received in SF #n.

In addition, if the MCS (and PMI) is indicated for each HARQ process index, the above-described rule may be applied to each HARQ process index.

4.1.2. L1 Signaling Method

Similar to SPS activation and/or release, which is allowed only for DCI format 0 in the legacy LTE system, AUL transmission activation and/or release may be allowed only for DCI format 0A/0B (not for DCI format 4A/4B) in the LAA SCell.

In the legacy LTE system, there is a restriction that SPI-related DCI shall be transmitted only in the PCell and SPS data shall also be transmitted in the PCell. However, in order to support AUL transmission in the U-band, AUL transmission-related DCI needs to be transmitted as well in a cell scheduling the U-band (e.g., LAA SCell).

Here, since the same DCI format as the conventional UL scheduling DCI is used for the DCI, the DCI needs to be distinguished by an RNTI value masking the CRC. For example, the DCI indicating activation and/or release of AUL transmission and/or retransmission of the AUL transmission may be CRC-scrambled by a separate RNTI (not the C-RNTI) configured for the UE.

If the UL scheduling cell is a U-band, the base station should perform the DL LBT (or CAP) for DCI transmission indicating activation and/or release of the AUL transmission and/or retransmission of the AUL transmission. Accordingly, if the base station fails in the LBT (or CAP), the base station may not attempt the DCI transmission.

Accordingly, in order to increase the success rate of the DCI transmission, AUL transmission may be allowed only when the UL scheduling cell is a licensed band cell (or PCell), not an LAA SCell. In other words, AUL transmission may not be allowed if the UL scheduling cell is a U-band cell. Alternatively, the UE may not expect auto_Tx to be configured for a UL scheduling cell which is a U-band.

When an AUL transmission is activated through multi-SF (or multi-slot) scheduling DCI (e.g., DCI format 0B), the number of SFs (or slots) corresponding to the value indicated by a field indicating the number of scheduled SFs (or slots) may refer to the number of SFs (or slots) for AUL transmission allowed within a set period (configured by L1 signaling or higher layer signaling) or refer to the maximum number of SFs in which actual transmission is allowed among the SFs configured for the AUL transmission.

Here, the field indicating the number of scheduled SFs may not be used for validation of AUL transmission activation. For example, if the period of the AUL transmission is set to 5 ms by the RRC signaling and the AUL transmission activation DCI indicates 2 as the number of scheduled SFs, this may mean that AUL transmission is configured for 2 ms with a 5 ms periodicity (e.g., SF #n/n+1/n+5/n+6 . . . ). In this case, activation of the AUL transmission through single SF (or slot) scheduling DCI (e.g., DCI format 0A) may mean that the number of SFs (or slots) for AUL transmission allowed within a set period is 1. Alternatively, when the period of AUL transmission is set to 5 ms and the duration is set to 3 ms by RRC signaling, if the AUL transmission activation DCI indicates 2 as the number of scheduled SFs, the maximum number of SFs in which transmission can be performed for 3 ms may be limited to 2.

Alternatively, considering that the size of the DCI is large and the blocking probability may increase because the multi-SF scheduling DCI may be transmitted on (E)PDCCH having a high aggregation level to ensure stable transmission, AUL transmission activation and/or release through the multi-SF scheduling DCI may not be allowed. In other words, AUL transmission activation and/or release may be allowed only for single SF (or slot) scheduling DCI. In this case, the base station which has failed to receive the AUL transmission over the consecutive SFs may be allowed to instruct corresponding AUL retransmission through the multi-SF scheduling DCI. Here, the multi-SF scheduling DCI may be CRC-scrambled by a separate RNTI (not C-RNTI) configured for AUL transmission, and the NDI value may be set to 1. In other words, the UE may not expect multi-SF scheduling DCI which is CRC-scrambled by a separate RNTI (not C-RNTI) configured for AUL transmission and has the NDI value set to 0.

Considering the complexity of implementation of a UE that should perform detection of (E)PDCCH through many carriers in the legacy LTE system if carrier aggregation is performed on many carriers, signaling for reducing (E)PDCCH blind detection (BD) per cell/aggregation level and skipping BD of specific DCI has been introduced. Furthermore, signaling for reducing BD per DCI format and skipping BD on LAA UL has been introduced.

If the number of times of BD is set to zero for DCI format(s) (e.g., DCI format 0A) which are allowed for AUL transmission activation and/or release or the UE can skip the BD, the AUL transmission may not be configured for the UE. Accordingly, if AUL transmission is configured for a UE, the number of times of BD for DCI format(s) (e.g., DCI format 0A) which are allowed for AUL transmission activation and/or release may be set to a specific value (e.g., 1) or a specific ratio value (e.g., 0.5) with respect to an conventional BD value, even if the number of times of BD is set to zero for DCI format(s) or the BD can be skipped.

Alternatively, a UE for which the number of times of BD is set to zero for the DCI format(s) (e.g., DCI format 0A) allowed for AUL transmission activation and/or release or the like or which is configured to skip the BD may be configured not to expect AUL transmission to be configured.

Alternatively, when there are multiple DCI formats allowed for AUL transmission activation and/or release, a UE for which AUL transmission is configured may expect AUL transmission activation and/or release to be performed in one of DCI formats to which the number of times of BD greater than or equal to a specific value (e.g., 1) is assigned, according to a predetermined rule.

4.1.3. Other AUL Transmission Activation and/or Release Methods

All parameters (e.g., periodicity, the number of SFs valid for AUL transmission within a period, DM-RS sequence information, modulation and coding scheme information, HARQ process index, resource allocation, etc.) which are necessary for AUL transmission may be configured by RRC signaling, and AUL transmission activation and/or release may be indicated by 1-bit information alone in L1 signaling.

Specifically, the base station may simultaneously indicate activation and/or release of AUL transmission to multiple UEs through UE (group-)common DCI, or indicate the activation and/or release to each of the UEs according to the respective fields of the DCI which are associated with the UEs.

For example, when UE group-common DCI for AUL transmission activation and/or release is configured in common for UE1 and UE2, the DCI may be configured to have a 2 bit-width, wherein the first bit of the two bits may be configured for auto_Tx activation and/or release for UE1, and the second bit may be configured for auto_Tx activation and/or release for UE2. Accordingly, UE 1 may recognize the DCI as indicating activation of the AUL transmission when the first bit information in the DCI is '1', (or recognize the DCI as indicating release of the AUL transmission when the first bit information is '0').

Alternatively, all parameters necessary for auto_Tx transmission and auto_Tx activation and/or release may be indicated only by L1 signaling (e.g., DCI format 0B) without configuration by separate RRC signaling (or without assistance from RRC signaling). In this case, at least DMRS CS, MCS, and HARQ process number fields among the proposed fields may not be utilized for validation. The period information may be configured by reinterpreting some fields (e.g., RV).

UL SFs (or slots or symbol groups) may be signaled through the UE (group-)common DCI. In this case, AUL transmission may be allowed only through the UL SFs (or slot or symbol groups) signaled by the DCI. In this case, all parameters (e.g., periodicity, the number of SFs valid for AUL transmission within a period, DM-RS sequence information, modulation and coding scheme information, HARQ process index, resource allocation, etc.) which are necessary for AUL transmission may be preconfigured by RRC signaling.

For example, in the LAA system to which the present invention is applicable, the base station may assign a part of the COT secured (or occupied) after the LBT (or CAP) to the UE for UL operation. To this end, the base station may signal information about the corresponding UL SFs on the common PDCCH. In addition, when the UE attempts UL transmission included in the UL SFs signaled on the common PDCCH, the UE may access a corresponding (unlicensed) channel with a little higher probability using type 2 channel access.

In this case, in order to increase the transmission probability of the AUL transmission, auto_TX may be allowed only for the corresponding UL SFs (i.e., some SFs of the COT pre-secured by the base station). Here, among the indicated UL SFs, the SF region where the AUL transmission will be actually attempted by the UE may be configured differently for each UE (preconfigured by higher layer signaling). For example, if four contiguous SFs are configured as the UL SFs, UE1 may be allowed to perform AUL transmission in the the first two SFs and UE2 may be allowed to perform AUL transmission in the last SF.

Additionally, in the LAA system, the base station may transmit 1-bit PUSCH trigger B capable of triggering a PUSCH triggered on the common PDCCH (PDCCH indicating some SFs of the COT pre-secured by the base station). If the PUSCH trigger B field is ON, most of the UL SFs configured on the common PDCCH may be filled with the triggered PUSCH. Accordingly, in this case, it may not be desirable to trigger AUL transmission. Thus, AUL transmission may be allowed in the indicated UL SFs only when PUSCH trigger B in the common PDCCH is OFF.

If there is no actual UL data when many AUL transmission resources are excessively configured to increase the UL transmission efficiency, it may be difficult for the base station to attempt signal transmission although there are resources that can be skipped.

Accordingly, if the base station indicates the number of symbols constituting the DL SF of the next SF on the common PDCCH in order to secure resources for DL data transmission, even the UEs may attempt DL reception even if the UEs have AUL transmission resources configured in the next SF.

Alternatively, in the case where the base station signals, on the common PDCCH, that a specific SF of a series of subsequent SFs or a region of some symbols in the specific SF is a DL SF or DL region, the UEs may attempt DL reception even if the UEs have an AUL transmission resource configured in the SF.

Alternatively, a UE that has been assigned DL data through UE-specific DL scheduling DCI may attempt to receive a DL signal in the SF even if there is an AUL transmission resource configured in the SF.

In addition, the UE of the LAA system may receive a configuration of a resource for measuring a received signal strength indicator (RSSI) value during a specific period/duration to report a RSSI measurement result. When the resource is defined as a RSSI measurement timing configuration (RMTC), the UEs may perform RSSI measurement without attempting AUL transmission, even if the UEs have an AUL transmission resource configured in an SF overlapping with the RMTC interval.

4.1.4. Method for Configuring PUSCH Starting Position for AUL Transmission

As a method for aligning starting positions of AUL transmission PUSCHs for different UEs, the PUSCH starting positions may be configured by RRC signaling or may be indicated by activation DCI (or HARQ feedback DCI for AUL transmission of the base station).

Alternatively, the starting positions may be configured differently among different UEs in consideration of time division multiplexing (TDM) between the UEs. To this end, different PUSCH starting positions for the respective UEs may be configured by RRC signaling or indicated by the activation DCI (or HARQ feedback DCI for AUL transmission of the base station), and may be determined differently for the respective UEs according to a preconfigured (UE-specific) rule.

In particular, when UL transmission can be performed through multiple LAA Scells (i.e., in the UL CA situation), the PUSCH starting positions need to be aligned in view of one UE. This is because, when it is assumed that the PUSCH starting position differs among the UL LAA SCells, the same UE should perform UL transmission on a cell while performing the LBT operation (i.e., DL operation) for UL transmission on another cell, but this operation requires the UE to have multiple RF chains. Accordingly, when one UE can perform UL transmission through multiple LAA SCells (i.e., in the UL CA situation), the UE may assume that the PUSCH starting positions for AUL transmission corresponding to the same SF are always configured/indicated to be identical if AUL transmission is configured through multiple UL LAA SCells for the UE.

In addition, PUSCH starting positions may be determined different for the respective UEs according to a preconfigured (UE-specific) rule. In this case, the PUSCH starting positions may be determined as a function of certain parameters (e.g., cell index, UE ID, SF index, etc.). Here, the certain parameters may refer to parameters irrelevant to the carrier index.

4.2. LBT (or CAP) Method

In the LAA system, UL transmission is allowed after type 2 channel access of a UE if any one of the following conditions is satisfied:

UL transmission is included in the COT that is secured (or occupied) by the base station;

UL SFs are configured on the carriers except for one carrier randomly selected for UL SFs (for which the same PUSCH starting position is indicated) among multiple carriers on which Type 1 channel access is configured; and the gap between a UL transmission and a subsequent UL transmission after the DL transmission is smaller than or equal to a certain time (e.g., 25 us).

For UL transmission through AUL transmission configuration, transmission candidate UL SFs (or slots) may be periodically configured. Accordingly, it may not be easy that the above conditions are always satisfied.

According to the present invention, type 1 channel access based on random backoff may be basically performed for UL transmission through AUL transmission configuration, and type 2 channel access may be allowed to be performed when any one of the above conditions is satisfied.

4.2.1. CWS Adjustment Method

For a random backoff-based channel access procedure (e.g., type 1 channel access), the UE may select a random number within the CWS, decrement the number by 1 each time the channel is idle, and may access the channel when the number reaches 0. In addition, in order to lower the probability of collision with other nodes contending in the U-band, if the base station fails to receive data transmitted by the UE, the UE may increase the CWS to lower the probability that other transmission nodes will select the same random number.

More specifically, when the UE receives a UL grant in SF #n in the LAA system, the UE may configure the first (transmission) SF of the UL TX bursts including the latest UL SF before the (n-3)-th SF as a reference SF. If initial transmission is indicated in the UL grant for at least one TB with respect to an HARQ process ID corresponding to the reference SF (or if the NDI value is toggled), the UE may initialize the CWS value. Otherwise, the CWS value is increased to the next value in a predetermined order.

According to the present invention, in performing the LBT (or channel access procedure) for AUL transmission, the UE may use the CWS value adjusted by the PUSCH.

Alternatively, if the UE receives a retransmission UL grant with respect to the reference SF during AUL transmission, the UE may increase the CWS values corresponding to all channel access priority classes. In this case, the increased CWS values may be applied k ms (e.g., k=4) after receiving the UL grant.

The reference SF may refer to the first SF of UL transmission bursts (or continuous AUL transmission) that have started to be transmitted k1 ms (e.g., k1=4) before the time at which the UL grant (or HARQ DCI) is received. Alternatively, the reference SF may be defined differently depending on whether the UL grant is received or the HARQ DCI is received. As an example, when a UL grant is received, the reference SF may refer to the first SF of the UL transmission bursts (transmitted after type 1 channel access procedure) which have been scheduled by a separate UL grant and started to be transmitted k1 ms (e.g., k1=4) before the time at which the UL grant is received. As another example, when HARQ DCI is received, the reference SF may refer to the first SF of continuous AUL transmission (transmitted after type 1 channel access procedure) (or the UL transmission bursts corresponding to the HARQ process indexes configured for the AUL transmission) that has started to be transmitted kl ms (e.g., k1=4) before the time at which the HARQ DCI is received.

Alternatively, when the base station succeeds in receiving the AUL transmission, the base station may not transmit a UL grant corresponding to an HARQ process index indicating the reception. Therefore, in such a case, the UE may need to initialize the CWS values.

Accordingly, if there is no retransmission UL grant corresponding to the AUL transmission transmitted by the UE (or if no retransmission UL grant is received) for T ms (e.g., T=16 or the number of HARQ process indexes configured for AUL transmissions) after the AUL transmission (or the first transmission time of continuous AUL transmission), the UE may initialize CWS values corresponding to all channel access priority classes.

Alternatively, if there is neither a retransmission UL grant for the AUL transmission transmitted by the UE for T ms (e.g., T=16 or the number of HARQ process indexes configured for AUL transmission) after the AUL transmission nor a retransmission UL grant for an AUL transmission (and PUSCH) transmitted for T ms (or if no retransmission UL grant is received), the UE may initialize the CWS values corresponding to all channel access priority classes.

Alternatively, when it is assumed that the time taken until an AUL transmission having the same configured HARQ ID corresponding to the SF(s) of the AUL transmission transmitted by the UE (or the reference SF of the continuous AUL transmission) appears after the AUL transmission SF(s) is T2 ms, the UE may initialize the CWS values corresponding to all channel access priority classes if the UE does not receive a retransmission UL grant for the SF(s) before T2-k2 ms (e.g., k2=4). For example, if HARQ process indexes corresponding to respective SFs are predetermined, AUL transmission is transmitted in SF #n, and a retransmission UL grant for SF #n is not received k2 ms before SF #(n+T2) for which the same HARQ process index as that for SF #n is configured (i.e., in the duration from SF #n to SF #(n+T2)-k2), the UE may initialize the CWS values corresponding to all channel access priority classes.

Alternatively, if the UE does not receive a retransmission UL grant for the reference SF for the time corresponding to the maximum value between T ms and T2-k2 ms proposed above, the UE may initialize the CWS values corresponding to all channel access priority classes.

Alternatively, the base station may attempt to transmit DCI indicating failure of AUL transmission (e.g., DCI including a retransmission UL grant or HARQ-ACK information), but fail to transmit the DCI because the UE continues to fail in the LBT (or channel access procedure). In this case, an operation (or action or mechanism) of the UE of increasing the CWS values may be needed.

As a method to perform this operation, the UE may increase the CWS values corresponding to all channel access priority classes if there is no DCI (e.g., DCI including a retransmission UL grant or HARQ-ACK information) corresponding to the AUL transmission transmitted by the UE for T ms after the AUL transmission (or after the first transmission time of continuous AUL transmission) (for example, retransmission for the AUL transmission may be triggered if there is no HARQ-ACK feedback of the base station for the AUL transmission for T ms or T−K (e.g., K=4) ms).

Alternatively, the UE may increase the CWS values corresponding to all channel access priority classes if there is neither DCI (e.g., DCI including a retransmission UL grant or HARQ-ACK information) for the AUL transmission transmitted by the UE for T ms after the AUL transmission (for example, retransmission for the AUL transmission may be triggered if there is no HARQ-ACK feedback of the base station for the AUL transmission for T ms or T-K (e.g., K=4) ms), nor DCI for an AUL transmission (and PUSCH) transmitted for T ms.

Assuming that the base station transmits HARQ-ACK information for the AUL transmission of the UE to the UE, the UE may operate as follows.

First, when the UE receives an ACK for the HARQ process index of the reference SF, the UE may initialize the CWS values corresponding to all channel access priority classes.

Alternatively, the UE may increase the CWS values corresponding to all channel access priority classes when the UE receives NACK or DTX for the HARQ process index of the reference SF (wherein DTX means that the base station has failed to receive the AUL transmission corresponding to the HARQ process index, and wherein the DTX may be signaled as one of the HARQ-ACK states or may be joint-coded with information (e.g., RV) different from the HARQ-ACK states and signaled). The increased or initialized CWS values may be applied k ms (e.g., k=4) after the UE receives a UL grant.

If the UE fails to receive a (valid) UL grant and HARQ DCI for T ms from the first SF of the AUL transmission (and/or the UL transmission scheduled by the UL grant) (or from the SF in which the transmission ends) (or if the UE has received the UL grant and HARQ DCI for T ms but the received UL grant and HARQ DCI are invalid), the UE may increase the CWS values corresponding to all channel access priority classes with respect to AUL transmission (transmitted by performing the type 1 channel access procedure) transmitted after T ms (and/or UL data scheduled by the UL grant). In this case, the UL grant or HARQ ACK may be considered as an invalid UL grant or invalid HARQ DCI if at least one of the following conditions is satisfied:

the UL grant and/or HARQ DCI are received within k2 ms (e.g., k2=3) from the first SF of the AUL transmission (and/or UL transmission scheduled by the UL grant) (or the SF in which the transmission ends);

the first SF (or last SF) of the transmission is an AUL transmission SF and a UL grant is received for T ms after the AUL transmission (or within T ms after k2 ms);

the first SF (or last SF) of the transmission is a UL transmission scheduled through the UL grant and (AUL transmission related) HARQ DCI is received for T ms after the UL transmission (or within T ms after k2 ms);

the first SF (or last SF) of the transmission is a UL transmission scheduled through the UL grant, (AUL transmission related) HARQ DCI is received for T ms after the UL transmission (or within T ms after k2 ms), and the HARQ DCI does not include HARQ-ACK information corresponding to an HARQ process index associated with the first SF (or last SF); and the first SF (or last SF) of the transmission is a UL transmission scheduled through the UL grant, (AUL transmission related) HARQ DCI is received for T ms after the UL transmission (or within T ms after k2 ms), and the HARQ DCI includes HARQ-ACK information corresponding to an HARQ process index associated with the first SF (or last SF), wherein the included information is NACK.

Further, the UE may adjust the CWS as disclosed below according to the following cases. The cases considered in the present invention are as follows.

Case 1) The HARQ process index corresponding to the first SF of the UL TX bursts started at the time (i.e., SF #n-4) 4 SFs before SF #n in which the UE receives HARQ DCI is not configured for AUL transmission.

Case 2) The first SF of the UL TX bursts started at the time (i.e., SF #n-4) 4 SFs before SF #n in which the UE receives a UL grant is an AUL transmission.

Case 3) The HARQ process index corresponding to the first SF of the UL TX bursts started at the time (i.e., SF #n-4) 4 SFs before SF #n in which the UE receives HARQ DCI is configured for AUL transmission, but the SF has been scheduled through a UL grant and the HARQ-ACK information corresponding to the HARQ process index included in the HARQ DCI is NACK.

In Case 1 (or Case 2 or Case 3) as described above, the UE may increase or maintain the CWS corresponding to all priority classes.

Alternatively, in Case 1, Case 2 or Case 3, the UE may consider a reference SF positioned at an earlier time for adjustment of the CWS than in the above-described embodiment.

More specifically, in Case 1, the SF of a UL TX burst in which the HARQ process index corresponding to the first SF is configured for AUL transmission among the UL TX bursts started before SF #n-4 may be defined as a reference SF, or the SF of a UL TX burst in which the HARQ process index corresponding to the first SF is configured for AUL transmission among the UL TX bursts started before SF #n-4 and which is not scheduled through a UL grant may be defined as a reference SF.

In Case 2, the SF of a UL TX burst in which the HARQ process index corresponding to the first SF is not configured for AUL transmission among the UL TX bursts started before SF #n-4 may be defined as a reference SF, or the SF of a UL TX burst in which the HARQ process index corresponding to the first SF is configured for AUL transmission among the UL TX bursts started before SF #n-4 and which is scheduled through a UL grant may be defined as a reference SF.

Alternatively, in Case 1, the SF of a UL TX burst in which the HARQ process index corresponding to the first SF is configured for AUL transmission among the UL TX bursts started before SF #n-4 may be defined as a reference SF, or the SF of a UL TX burst in which the HARQ process index corresponding to the first SF is configured for AUL transmission among the UL TX bursts started before SF #n-4 and which is not scheduled through a UL grant may be defined as a reference SF.

As described above, if the UE does not receive a (valid) UL grant and HARQ DCI for T ms from the first SF of the AUL transmission (and/or the UL transmission scheduled by the UL grant) (or from the SF in which the transmission ends) (or if the UE has received the UL grant and HARQ DCI for T ms but the received UL grant and HARQ DCI are invalid), the UE may increase the CWS corresponding to all channel access priority classes for AUL transmission (transmitted by performing the type 1 channel access procedure) (and/or UL data scheduled by the UL grant) transmitted T ms after the first SF (or the SF in which the transmission ends).

More specifically, the UE may operate a timer for each UL TX burst and increment the timer value in SF units (or msec) from the reference SF (e.g., the first SF of the corresponding UL TX burst or the SF in which the transmission ends).

If there is any timer whose value is greater than or equal to T (or greater than T) when the UE performs the LBT (or channel access procedure) for AUL transmission (transmitted by performing the type 1 channel access procedure) (and/or UL data scheduled by a UL grant), the UE may increase or maintain the CWS corresponding to all priority classes. After increasing the CWS, the UE may reset a timer having the greatest value that is greater than or equal to T (or greater than T). If the UE receives a (valid) UL grant and HARQ DCI, the UE may reset all the timer values to zero.

Figure 15:
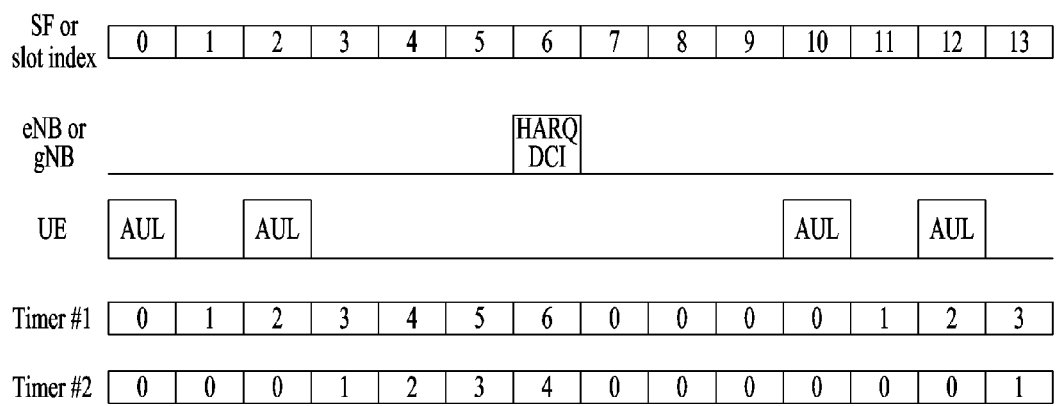
FIGS. 15 and 16 are diagrams schematically illustrating an operation of adjusting a contention window size (CWS) of a UE according to the present invention.
Figure 16:
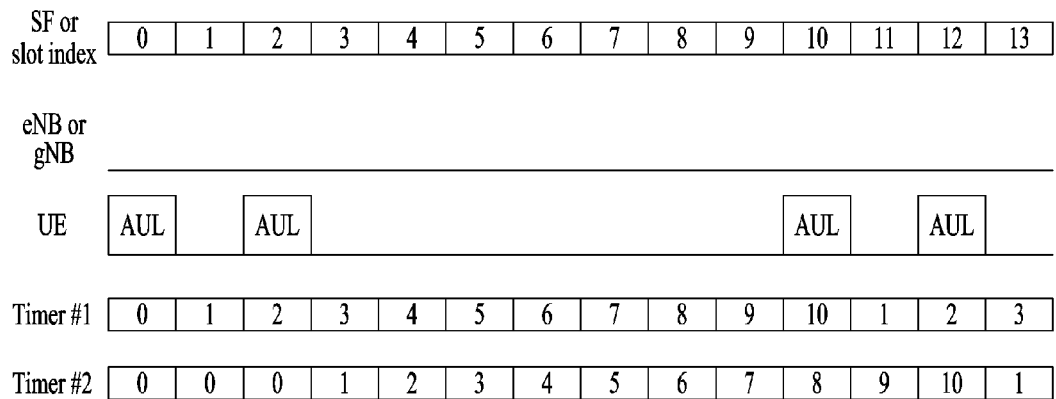

FIGS. 15 and 16 are diagrams schematically illustrating an operation of adjusting a contention window size (CWS) of a UE according to the present invention.

As an example, as shown in FIG. 15, the UE may increase Timer #1 from the AUL transmission burst started in SF #0 (or Slot #0, hereinafter relevant elements are all referred to as SF #N for simplicity, wherein SF #N may be interpreted as Slot #N), and increase Timer #2 from the AUL burst started in SF #2. Then, when the UE discovers (receives) HARQ DCI in SF #6, the UE may reset the two timers.

As another example, as shown in FIG. 16, the UE may increase Timer #1 from the AUL burst started in SF #0 (or Slot #0, hereinafter relevant elements are all referred to as SF #N for simplicity, wherein SF #N may be interpreted as Slot #N), and increase Timer #2 from the AUL burst started in SF #2. Thereafter, when the UE attempts to perform AUL transmission by performing Type 1 channel access procedure in SF #10 and T=8 ms, the UE may increase the CWS values and reset Timer #1 because Timer #1 is greater than T. Then, when the UE attempts to additionally perform AUL transmission by performing Type 1 channel access procedure in SF #12, there is a Timer #2 larger than T, and the UE may increase the CWS value (i.e., increase the CWS value twice compared to the CWS for SF #2 AUL transmission) and reset Timer #2 because Timer #2 is larger than T.

In the present invention, the base station may configure specific HARQ process number(s) for AUL transmission and schedule, through a dynamic UL grant, UL transmissions corresponding to not only the HARQ process number not allocated for AUL transmission but also the HARQ process number allocated for AUL transmission. Alternatively, the base station may be allowed to operate as described above.

For example, even though HARQ ID #0 is allocated for the AUL transmission among the 16 HARQ process numbers, the base station may schedule the PUSCH corresponding to HARQ ID #0 through the dynamic UL grant.

Further, HARQ feedback of the base station corresponding to AUL transmission may be introduced. Hereinafter, for simplicity, DCI for the HARQ feedback is referred to as HARQ DCI.

The HARQ DCI may be configured to always include HARQ-ACK information corresponding to the HARQ ID(s) configured for AUL transmission. If SF #n transmission for UL (re)transmission corresponding to an HARQ ID allocated for AUL transmission is scheduled through a dynamic UL grant and HARQ DCI is received after a certain time (e.g., SF #n+3) (when the SF is a reference SF), the UE may adjust the CWS as follows using the HARQ-ACK information corresponding to the HARQ ID of the reference SF in the HARQ DCI.

In this operation, the UE may not utilize the HARQ-ACK information in performing CWS adjustment since the UL (re)transmission is triggered through the dynamic UL grant (Method 1). In other words, the UE may maintain the CWS corresponding to all priority classes irrespective of the HARQ-ACK information.

Alternatively, the UE may consider only ACK information of the HARQ-ACK information corresponding to the HARQ ID as valid (Method 2). In other words, the UE may initialize the CWS value corresponding to all priority classes if the HARQ-ACK information corresponding to the HARQ ID is ACK, and maintain the CWS corresponding to all priority classes if the HARQ-ACK information is NACK.

In addition, if SF #n transmission for UL (re)transmission corresponding to an HARQ ID allocated for AUL transmission is scheduled through a dynamic UL grant, and HARQ DCI and the dynamic UL grant corresponding to the HARQ ID are received after a certain time (e.g., SF #n+3) (when the corresponding SF is a reference SF), the UE may adjust the CWS as follows using the HARQ-ACK information corresponding to the HARQ ID of the reference SF in the HARQ DCI in temporal order of the HARQ DCI and the dynamic UL grant.

If the HARQ DCI is received (for example, in SF #n+4) and the dynamic UL grant is subsequently received (for example, in SF #n+5), the UE may adjust the CWS by applying Method 1 or Method 2 described above.

On the other hand, if the dynamic UL grant is received (for example, in SF #n+4) and the HARQ DCI is subsequently received (for example, in SF #n+5), the UE may consider the HARQ-ACK information in the HARQ DCI corresponding to the HARQ ID as invalid.

In this case, the UE may expect that the ACK/NACK information in the HARQ DCI will not be different from the NDI toggle information in the UL grant.

Alternatively, if the two pieces of information are different from each other, the UE may preferentially take into consideration one of the HARQ DCI information or the NDI information in the UL grant.

For example, the UE may prioritize information that precedes between the HARQ DCI and UL grant in temporal order, or prioritize one of the HARQ DCI and UL grant that is later in temporal order.

Alternatively, which of the HARQ DCI and the UL grant is prioritized by the UE may be configured differently depending on whether the HARQ DCI information is ACK/NACK. For example, the UE may prioritize the HARQ DCI (namely, unconditionally consider the NDI of the HARQ DCI as toggled) if the HARQ DCI corresponds to ACK, and prioritize the UL grant if the HARQ DCI corresponds to NACK.

Alternatively, the UE may conservatively perform retransmission if any one of the HARQ DCI and the UL grant indicates retransmission. As a specific example, the UE may recognize the transmission as a new transmission (initial transmission) only when the HARQ DCI is ACK and the UL grant is NDI toggle, and recognize the transmission as retransmission in the other cases.

4.2.2. Configuring Channel Access Priority Class

As described above, in the LAA system, four UL channel access priority classes are defined, and a defer duration (defer period), allowed CWS values, the maximum allowed COT, and the like are set for each priority class.

In this case, the channel access priority class value for AUL transmission may be fixed to a specific value (e.g., priority class 1) or may be configured by RRC signaling.

Alternatively, the channel access priority class value for AUL transmission may be set via the AUL transmission activation DCI. In this case, the field indicating a priority class in the DCI may not be used for validation of AUL transmission activation.

Alternatively, the channel access priority class value for AUL transmission may be determined according to the number of SFs (or slots) (or transmission time) in which transmission will be actually performed, the duration of an AUL transmission configured within a period, or the maximum number of SFs in which transmission may be performed within the duration. For example, if the duration of the AUL transmission (or the maximum number of SFs in which transmission may be performed within the duration) set in the period is 3 ms, the channel access priority class value for the AUL transmission may be set to priority class 2, which is larger than or equal to the duration and has the smallest the MCOT, based on Table 7. Alternatively, if the duration of the AUL transmission (or the maximum number of SFs in which transmission may be performed within the duration) is set to 3 ms for the UE, but the UE fails in the LBT (or channel access procedure) for the first SF and thus actually performs transmission in only two SFs, the UE may set LBT parameters, considering the channel access priority class value for AUL transmission as priority class 1.

Alternatively, the channel access priority class value for the AUL transmission may be set by the periodicity of the AUL transmission. For example, if the period is shorter than or equal to P ms, the UE may perform the LBT (or channel access procedure) excessively frequently, which may increase the number of transmission attempts compared to the attempts made by other transmission nodes that contend with the UE. Accordingly, in the above case, a relatively higher priority class may be assigned as the channel access priority class value for the AUL transmission. As another example, if the period is longer than P ms, a relatively small priority class may be assigned as the channel access priority class value for the AUL transmission. As an example applicable to the present invention, priority class 3 may be assigned as the channel access priority class value for the AUL transmission when the period is shorter than 10 ms, and priority class 1 may be assigned as the channel access priority class value for the AUL transmission when the period is longer than or equal to 10 ms. More generally, priority class Y may be assigned as the channel access priority class value for the AUL transmission if the period is less than X, and priority class Z may be assigned as the channel access priority class value for the AUL transmission if the period is greater than X, where Y> Z may be satisfied.

4.2.3. Methods of Signaling Remaining COT in Case of UE-Initiated COT

In the Rel-14 eLAA system, a part of the channel occupancy time (COT) occupied by the base station may be handed over to the UE, and an LBT type (Type 2 channel access procedure) capable of starting transmission if the channel is idle only for a certain time may be indicated to the UE. In response, the UE recognizing that a part of the COT is handed over thereto may switch to the Type 2 CAP (that is, perform the Type 2 CAP instead of Type 1 CAP indicated through the UL grant) and perform UL transmission even when Type 1 channel access procedure (CAP) is indicated to the UE through the UL grant.

In this case, since the UE autonomously selects a channel access priority class for the AUL transmission of the UE, only the UE may know the value of the COT that the UE occupies after the LBT. Accordingly, it may be necessary to signal to the base station how long the UE has occupied the COT, or how much of the COT has remained. Accordingly, a method of signaling the COT value occupied by the UE will be described in detail below.

4.2.3.1. First Signaling Method

The UE may signal to the base station the COT value remaining according to occupancy and how much of the corresponding COT is to be occupied by the UE. For example, if the (maximum) COT value that the UE occupies after performing Type 1 CAP for AUL transmission is 8 SFs and the UE is to perform the AUL transmission for 3 SFs, the UE may signal 8 and 3 to the base station at the same time. In addition, for the signaling, the values may be counted down during continuous AUL transmission and signaled in each SF. Thus, according to the previous example, the UE may signal 8 and 3 in the latest SF and signal 7 and 2 in the next SF in which the AUL transmission is performed.

4.2.3.2. Second Signaling Method

The UE may signal, to the base station, the ending time (offset) of the AUL transmission and the remaining COT value (duration) from the ending time. For example, when the UE starts the AUL transmission from SF #n after performing Type 1 CAP for AUL transmission, and the (maximum) occupied COT is 8 SFs and the UE is to perform AUL transmission for 3 SFs in the future, the UE may signal 3, which is the offset value, and 5, which is the duration value, to the base station at the same time. For the signaling, the offset value may be counted down during continuous AUL transmission and signaled in each SF. Accordingly, according to the previous example, the UE may signal 2, which is the offset value, and 5, which is the duration value, to the base station simultaneously in the next AUL transmission SF, SF #n+1.

In this case, there may be a restriction that the base station receiving the COT-related signaling of the UE is allowed to start DL transmission k SFs (e.g., k=3) after the last SF of the AUL transmission occupied by the UE. In addition, the base station may receive the COT-related signaling from multiple UEs. In this case, the base station may consider only the overlapping time between the COTs of the UEs (or the entire time corresponding to the union of the COTs of the UEs) as a COT shared with the UEs, and thus may perform an LBT (or CAP) allowing transmission to be started if the channel is idle only for a certain time as LBT (or CAP) for DL transmission that is transmitted within the overlapping time.

4.2.4. LBT Method Used when PUSCH and AUL Transmission are Arranged Consecutively FIG. 17 is a diagram illustrating the operation of a UE according to an embodiment of the present invention.

Figure 17:
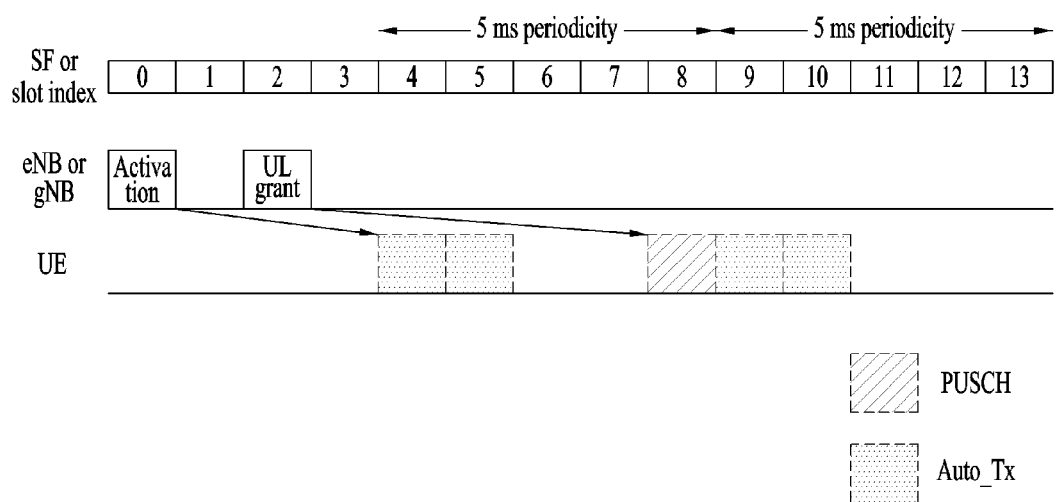
FIG. 17 is a diagram illustrating the operation of a UE according to an embodiment of the present invention.

As shown in the example of FIG. 17, if an AUL transmission having a 5 ms period and a 2 ms duration is triggered through activation DCI transmitted in SF #0 (or Slot #0, hereinafter relevant elements are all referred to as SF #N for simplicity, wherein SF #N may be interpreted as Slot #N) (or if an AUL transmission resource is configured using other methods, such as a bit-map), UL data may be scheduled in SF #8.

If UL data should always be transmitted for AUL transmission UL SFs configured in the U-band, the base station scheduling SF #8 may indicate, in the UL grant (or through the UL grant), the priority class value that is set considering the 3 ms COT.

However, it may be inefficient for the UE to transmit UL data in all the configured AUL transmission SFs in terms of operation of the U-band. This is because the operation of the UE of performing the LBT (or CAP) for UL transmission and transmitting a kind of dummy data when UL data to be actually transmitted is not stored in the UE buffer only applies interference to other nodes and does not contribute to improvement of the system performance. Accordingly, for the configured AUL transmission UL SFs, the UE may perform transmission if there is data to be actually transmitted and skip the UL SFs (i.e., skip UL transmission in the UL SFs) otherwise.

If the UE can skip the above operation, it may be difficult for the base station scheduling SF #8 in the example of FIG. 17 to check whether UL data is transmitted in SF #9 and SF #10. Accordingly, the base station may indicate priority class 1, in which a maximum of 2 ms is allowed as the MCOT, in the UL grant (or through the UL grant).

However, in the above case, when the UE receiving the UL grant succeeds in the LBT (or CAP) using the LBT parameters corresponding to priority class 1, UL transmission may be allowed only in SF #8 and SF #9 and may not be allowed in SF #10 (even if there is UL data to be transmitted in SF #9 and SF #10). Hereinafter, methods to address this issue will be described.

(Method 1)

Even if the priority class value is indicated as 1 in a UL grant for SF #8, the UE to attempt AUL transmission in SF #9 and SF #10 may attempt the LBT (or CAP) using LBT parameters corresponding to priority class 2 in which a maximum of 3 ms is ensured as the MCOT.

(Method 2)

The UE may be configured to always perform a new LBT (or CAP) before AUL transmission starts even when UL SFs are contiguously configured for a dynamically scheduled PUSCH and the AUL transmission. That is, even if the UE has succeeded in the previous LBT (or CAP) immediately before SF #8, the UE may transmit the UL SFs for the AUL transmission from the time at which the UE attempts and succeeds in the LBT (or CAP) again after the UL transmission in SF #8. In response, the base station may set the PUSCH starting position of the first SF of the AUL transmission to be later than the SF boundary. In this case, if the UE succeeds in the LBT (or CAP) during the gap between the SF boundary and the set PUSCH starting position, the UE may successfully transmit the first SF of the AUL transmission as well.

(Method 3)

After transmitting as many UL SFs as the MCOT corresponding to the priority class (indicated in the UL grant) based on the previously attempted LBT (or CAP), the UE may attempt a new LBT (or CAP) for the remaining auto_Tx transmission. For example, in the example of FIG. 17, for the UE having attempted UL transmission since SF #8, the 2 ms transmission may be guaranteed to the maximum because the priority class value indicated in the UL grant is 1. Accordingly, after the UE performs a UL transmission in SF #8 and SF #9, the UE may perform a new LBT (or CAP) to attempt transmission of UL SFs for the next AUL transmission.

Methods 1 to 3 described above may be generally applied even to a case where a PUSCH is scheduled without a timing gap prior to a preconfigured AUL transmission resource. For example, in FIG. 17, the base station may schedule a PUSCH for SF #9 through the UL grant. In this case, when the UE transmits the PUSCH and an AUL transmission for SF #10, methods 1 to 3 described above may be applied.

When the UE determines the priority class for the AUL transmission based on the type of UL data present in the buffer of the UE, a PUSCH may be scheduled without a timing gap prior to a preconfigured AUL transmission resource as described above. In this case, a different rule may be applied according to the relation between the priority class indicated for the PUSCH (hereinafter referred to as scheduled UL (SUL) for simplicity) and the priority class determined for the AUL transmission by the UE.

More specifically, it is assumed that X is indicated in the UL grant as the priority class for the SUL and the UE determines Y as the priority class for AUL transmission.

In this case, when X<Y, UL data traffic with a lower priority appears later, and accordingly the UE may perform transmissions by prioritizing the SUL and then perform an LBT (or CAP) for AUL transmission. Alternatively, in performing an LBT (or CAP) for SUL, the UE may utilize LBT parameters (e.g., defer period, minimum CWS, maximum CWS, etc.) corresponding to priority class Y (or a priority class higher than Y) for the LBT (or CAP). If the UE succeeds in the LBT (or CAP) (if priority class Y is smaller than the MCOT), continuous transmission may be performed without any additional LBT (or CAP) (or continuous transmission may be allowed for the UE without any additional LBT).

When X=Y, both priorities are the same, and accordingly continuous transmission may be allowed without any additional LBT (or CAP) if the sum of the transmission times of the SUL and AUL transmission is smaller than the MCOT corresponding to priority class X. If the sum of the transmission times of the SUL and the AUL transmission is larger than the MCOT corresponding to priority class X for the UE, the UE may perform transmissions by prioritizing the SUL and then perform an LBT (or CAP) for the AUL transmission.

When X>Y, UL data traffic with a higher priority appears later, and accordingly continuous transmission may be allowed without any additional LBT (or CAP) if the sum of the transmission times of the SUL and the AUL transmission is smaller than the MCOT corresponding to priority class X. Alternatively, since the both priority classes are different from each other, the UE may perform transmissions by prioritizing the SUL and then perform an LBT (or CAP) for the AUL transmission.

Figure 18:
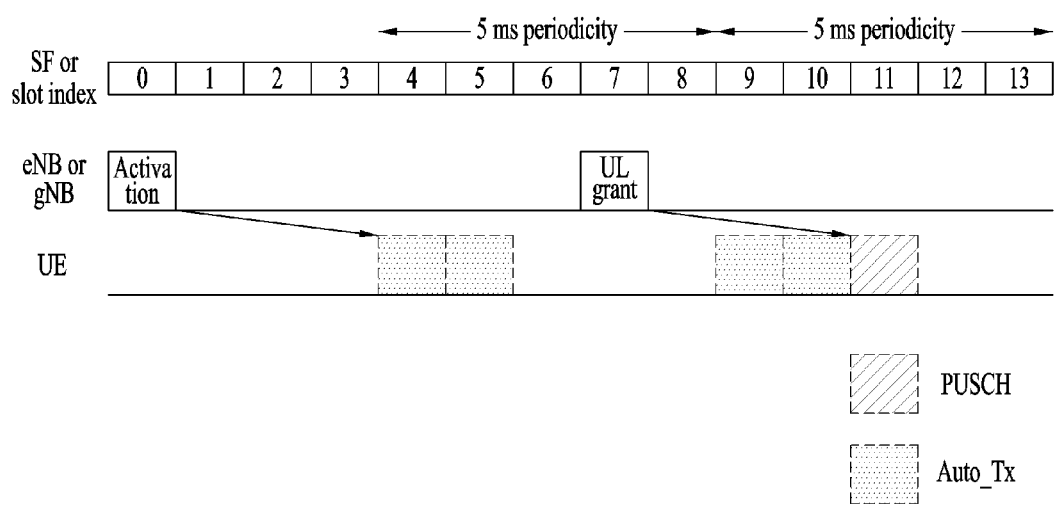
FIG. 18 is a diagram illustrating the operation of the UE according to another embodiment of the present invention.

FIG. 18 is a diagram illustrating the operation of the UE according to another embodiment of the present invention.

Unlike the example of FIG. 17, the PUSCH may be scheduled after the AUL transmission as in FIG. 18. In this case, the base station is not certain of UL transmission in SF #9 (or slot #9, hereinafter referred to as SF #N for simplicity, wherein SF #N may be interpreted as slot #N) and SF #10, and accordingly the base station may indicate priority class 1 in the UL grant (or through the UL grant) scheduling UL transmission in SF #11.

In this case, the UE may pre-perform an LBT (or CAP) for the AUL transmission in SF #9 without knowing that the PUSCH may be scheduled in SF #11. In particular, the LBT (or CAP) may be an LBT (or CAP) that is not allowed for 3 ms continuous transmission from SF #9 to SF #11. In this case, the UE may change the priority class to priority class 2 for the 3 ms continuous transmission as in Method 1 described above. However, this operation may not be easy in UE implementation. Accordingly, to address the issue as described above, the present invention proposes the following methods.

(Method A)

The UE may prioritize the UL transmission in SF #11, and thus may always leave the last n symbols of SF #10 blank to perform a new LBT (or CAP) for the UL transmission in SF #11 during the n symbols. The value of n may be predetermined or may be set through separate signaling. Alternatively, the value of n may be determined based on the priority class indicated in SF #11. In particular, for a smaller priority class, n may be set to a smaller value.

(Method B)

The UE may prioritize transmission of AUL transmission. Thus, the UE may start a new LBT (or CAP) for SF #11 after completing UL transmission in SF #10.

Whether the UE will use (or perform) Method A or Method B may be configured by higher layer signaling.

Alternatively, if transmission on 7 or fewer symbols in 1 SF consisting of 14 symbols is configured for the UE, the UE may apply Method B. Otherwise, the UE may apply Method A.

For example, in Method A and/or Method B described above may be applied only when the gap between the time of the UL grant and the first SF of the AUL transmission is smaller than or equal to Y ms (e.g., Y=4).

Methods A and B described above may be generally applied when a PUSCH is scheduled without a timing gap following a AUL transmission resource preconfigured for the UE. For example, in FIG. 17, the base station may schedule a PUSCH for SF #10 through the UL grant. When the UE transmits the PUSCH and an AUL transmission for SF #9, the UE may apply Method A or Method B.

When the UE determines the priority class for the AUL transmission based on the type of UL data present in the buffer of the UE, a PUSCH may be scheduled without a timing gap following a preconfigured AUL transmission resource as described above. In this case, a different rule may be applied according to the relation between the priority class indicated for the PUSCH (SUL) and the priority class determined for the AUL transmission by the UE.

More specifically, it is assumed that X is determined as the priority class for the AUL transmission and Y is indicated through the UL grant as the priority class for the SUL.

In this case, when X<Y, In this case, when X<Y, UL data traffic with a lower priority appears later, and accordingly the UE may perform transmissions by prioritizing the AUL transmission and then perform an LBT (or CAP) for SUL transmission. Alternatively, the UE may prioritize the SUL transmission and may thus terminate the AUL transmission n symbols earlier than the ending time in order to provide an LBT gap for the SUL. Alternatively, in performing an LBT (or CAP) for the AUL transmission, the UE may utilize LBT parameters (e.g., defer period, minimum CWS, maximum CWS, etc.) corresponding to priority class Y (or a priority class higher than Y) for the LBT (or CAP). If the UE succeeds in the LBT (or CAP) (if priority class Y is smaller than the MCOT), continuous transmission may be performed without any additional LBT (or CAP) (or continuous transmission may be allowed for the UE without any additional LBT).

When X=Y, both priorities are the same, and accordingly continuous transmission may be allowed without any additional LBT (or CAP) if the sum of the transmission times of the SUL and AUL transmission is smaller than the MCOT corresponding to priority class X. If the sum of the transmission times of the SUL and the AUL transmission is larger than the MCOT corresponding to priority class X for the UE, the UE may perform transmissions by prioritizing the AUL transmission and then perform an LBT (or CAP) for the SUL transmission. Alternatively, the UE may prioritize the SUL transmission and may thus terminate the AUL transmission n symbols earlier than the ending time in order to provide an LBT gap for the corresponding SUL.

When X>Y, UL data traffic with a higher priority appears later, and accordingly continuous transmission may be allowed without any additional LBT (or CAP) if the sum of the transmission times of the SUL and the AUL transmission is smaller than the MCOT corresponding to priority class X. Alternatively, since the both priority classes are different from each other, the UE may perform transmissions by prioritizing the AUL transmission and then perform an LBT (or CAP) for the SUL transmission. Alternatively, the UE may prioritize the SUL transmission and thus terminate the AUL transmission n symbols earlier than the ending time in order to provide an LBT gap for the SUL.

4.3. Transmit Power Control (TPC) Methods

In the legacy LTE system, TPC for the SPS UL SF has been performed through the TPC field in the UL grant and DCI format 3/3A. However, TPC through DCI format 3/3A does not apply to the SCell, and accordingly it may not be easy to apply TPC to AUL transmission through a closed loop. Hereinafter, TPC methods to address this issue will be described in detail.

4.3.1. First TPC Method

The UE may simultaneously apply PUSCH TPC through DCI format 3/3A to both the PCell (or PSCell) and the LAA SCell.

Alternatively, the UE may apply the PUSCH TPC through DCI format 3/3A only to the LAA SCell having AUL transmission configured therefor.

Alternatively, the UE may apply the PUSCH TPC through DCI format 3/3A to the LAA SCell only if the PCell (or PSCell) and the LAA SCell belong to the same timing advance group (TAG).

4.3.2. Second TPC Method

In an example applicable to the present invention, a field corresponding to TPC for the LAA SCell may be newly defined in DCI format 3/3A transmitted on the PCell.

For example, for DCI format 3/3A including M TPC commands, command M1 may be configured as a TPC command for the PCell of UE1, command M2 may be configured as a TCP command for LAA SCell #1 of UE1, and command M3 may be configured as a TCP command for LAA SCell #2 of UE1. In this case, a TPC command corresponding to an LAA SCell may be applied to multiple LAA SCells which are configured for the UE (and in which AUL transmission is configured). Specifically, there may be one TPC command corresponding to the LAA SCell configured for a specific UE, and the TPC command may be commonly applied to all LAA SCells which are configured for the UE (and in which AUL transmission is configured).

This method may be applied only when the PCell and the LAA SCell belong to different TAGs.

4.3.3. Third TPC Method

In another example applicable to the present invention, UE (group-)common DCI for TPC to be transmitted in a U-band (e.g., LAA SCell) may be introduced. For this purpose, similar to the case of DCI format 3/3A, a rule may be predefined such that a TPC command at a specific position among M TPC commands is applied to the UE. In this case, the UE may apply the corresponding TPC command only to the LAA SCell in which the DCI has been transmitted (and AUL transmission is configured), or may apply the TPC command to all LAA SCells which are configured (and in which AUL transmission is configured) in common.

Additionally, in performing the LBT (or CAP) for the UL SFs configured for AUL transmission, if a channel access priority class is preconfigured, a higher power offset value may be set for a lower priority class value, considering (or recognizing) UL data for the lower priority class value as more urgent. For example, 6 dB power boost may be configured for priority class 1 and 3 dB power boost may be configured for priority class 2.

Figure 19:
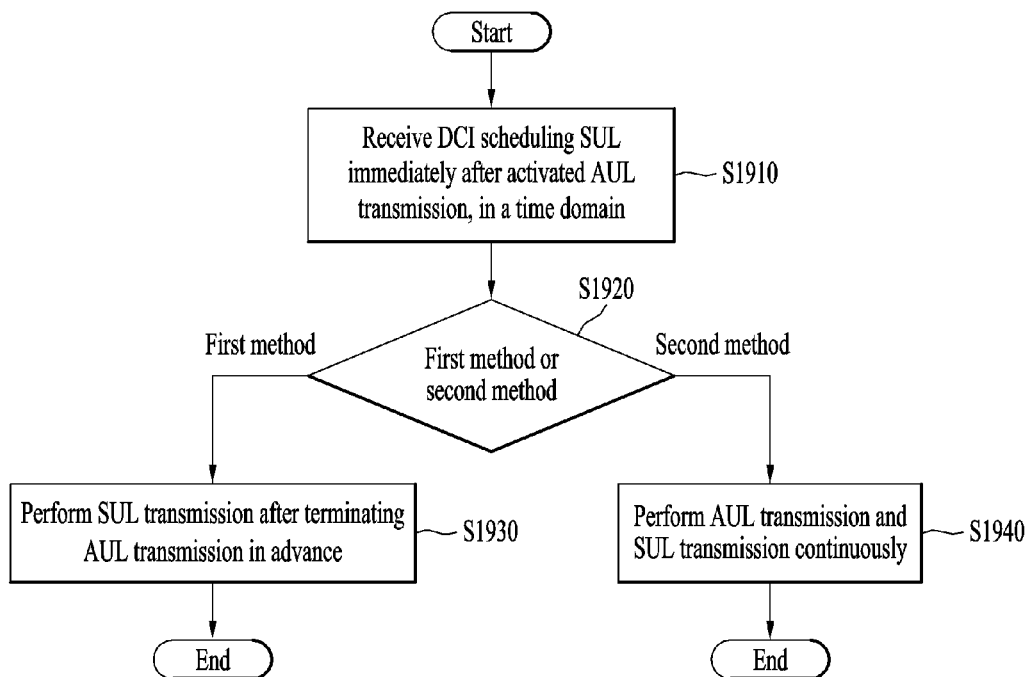
FIG. 19 is a flowchart illustrating a method of transmitting an uplink signal from a UE through an unlicensed band according to an embodiment of the present invention.

FIG. 19 is a flowchart illustrating a method for transmitting an uplink signal from a UE through a U-band according to an embodiment of the present invention.

In the time domain, the UE receives downlink control information (DCI) for scheduling uplink transmission immediately after activated AUL (autonomous uplink) transmission (S1910). For simplicity, the uplink transmission scheduled through the DCI is referred to as scheduled uplink (SUL) transmissions.

Subsequently, the UE performs the AUL transmission and the SUL transmission through the U-band based on a first method or a second method (S1920).

For example, when the UE performs the AUL transmission and the SUL transmission based on the first method, the UE may terminate ongoing AUL transmission a certain time interval before the SUL transmission and perform the SUL transmission (S1930).

Here, the certain time interval may correspond to an N (where N is a natural number) symbol interval. As a specific example, one symbol, two symbols, or fourteen symbols (i.e., one subframe or one slot) may be applied as the N symbols.

In more detail, when the UE performs the AUL transmission and the SUL transmission based on the first method, the UE may perform the AUL transmission based on a first channel access procedure (CAP) for the AUL transmission and the SUL transmission based on a second CAP for the SUL transmission.

As another example, when the UE performs the AUL transmission and the SUL transmission based on the second method, the UE may perform the AUL transmission and the SUL transmission continuously (S1940).

Here, the UE may perform the AUL transmission and the SUL transmission based on the second method when the following conditions are satisfied:
- A priority class for the AUL transmission is larger than or equal to a priority class for the SUL transmission;
- a sum of lengths of the AUL transmission and the SUL transmission is smaller than a maximum channel occupancy time (MCOT) corresponding to the priority class for the AUL transmission In more detail, when the UE performs the AUL transmission and the SUL transmission based on the second method, the UE may perform the AUL transmission and the SUL transmission continuously based on a channel access procedure (CAP) for the AUL transmission.

Figure 20:
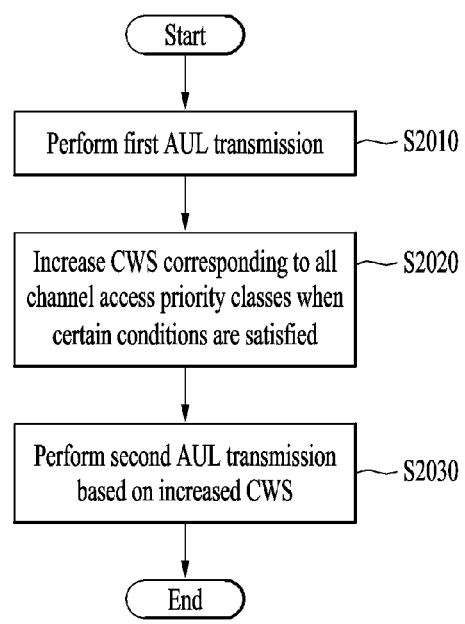
FIG. 20 is a flowchart illustrating a method of transmitting an uplink signal from a UE through an unlicensed band according to an embodiment of the present invention.

FIG. 20 is a flowchart illustrating a method for transmitting an uplink signal from a UE through a U-band according to another embodiment of the present invention.

The UE performs an activated first autonomous uplink (AUL) transmission through the U-band (S2010).

Then, when the UE does not receive when downlink control information (DCI) including an uplink grant scheduling uplink transmission or acknowledgement information during a certain time after the first AUL transmission, the UE increases contention window sizes (CWSs) corresponding to all channel access priority classes (S2020).

Then, the UE performs active second AUL transmission through the U-band based on the increased CWSs (S2030).

Here, the DCI may correspond to DCI including an uplink grant for scheduling a retransmission with respect to the first AUL transmission or acknowledgment information with respect to the first AUL transmission.

In addition, the certain time may correspond to one or more subframes.

Additionally, when the first AUL transmission or the second AUL transmission is performed in a plurality of cells, starting positions of the first AUL transmission or the second AUL transmission in the plurality of cells may be configured to be identical.

In the configuration above, the UE may operate as follows.

The UE may perform the first AUL transmission based on a first channel access procedure (CAP) for the first AUL transmission. The UE may perform the second AUL transmission based on a second CAP, to which the increased CWSs are applied, for the second AUL transmission.

In the method for performing uplink transmission from the UE through the U-band as illustrated in FIGS. 19 and 20, a first DCI activating a specific AUL transmission (e.g., the first AUL transmission) and a second DCI releasing the specific AUL transmission (e.g., the first AUL transmission) may be distinguished from a third DCI including acknowledgment information corresponding to the specific AUL transmission (e.g., the first AUL transmission) based on a value of a first field.

As an example, the first field may correspond to a physical uplink shared channel (PUSCH) trigger A field, which is defined in the 3GPP TS 36.212 standard. As another example, the first field may correspond to another field defined in the 3GPP TS 36.212 standard.

In addition, the first DCI may be distinguished from the second DCI based on a value of a second field. As an example, the second field may correspond to a timing offset field defined in the 3GPP TS 36.212 standard. As another example, the second field may correspond to another field defined in the 3GPP TS 36.212 standard.

In the configurations above, the first DCI, the second DCI, and the third DCI may have an identical size.

In addition, the first DCI, the second DCI, and the third DCI may be scrambled by a radio network temporary identifier (RNTI) different from a cell-C-RNTI.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

5. Device Configuration

Figure 21:
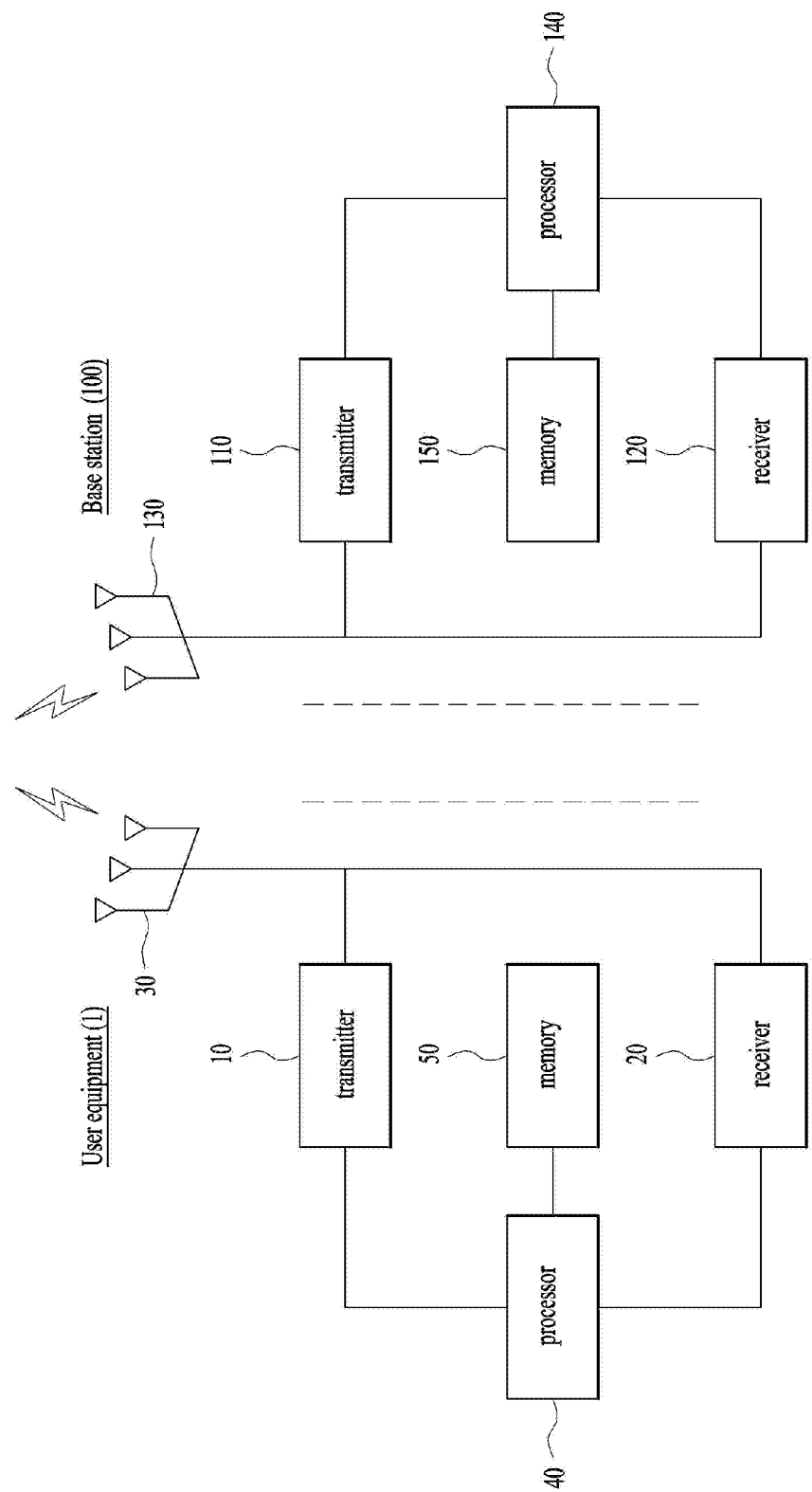
FIG. 21 is a diagram illustrating a configuration of a UE and a base station in which the proposed embodiments may be implemented.

FIG. 21 is a diagram illustrating configurations of a UE and a base station capable of being implemented by the embodiments proposed in the present invention. The UE and the base station shown in FIG. 21 operate to implement the above-described embodiments of the method of uplink signal transmission/reception between the UE and the base station.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE configured as described above may operate as follows.

In an example, the UE 1 receives, through the receiver 20, downlink control information (DCI) scheduling uplink transmission immediately after activated autonomous uplink (AUL) transmission, in the time domain. Then, the UE 1 performs the AUL transmission and the uplink transmission through the U-band based on a first method or a second method, using the transmitter 10.

Here, the first method corresponds to a method that the UE terminates ongoing AUL transmission a certain time interval before the uplink transmission and performs the uplink transmission, and the second method corresponds to a method that the UE performs the AUL transmission and the uplink transmission continuously.

In another example, the UE 1 performs activated first autonomous uplink (AUL) transmission through the U-band, using the transmitter 10. Then, when the UE 1 fails to receive downlink control information (DCI) comprising an uplink grant scheduling uplink transmission or acknowledgement information during a certain time after the first AUL transmission, the UE 1 increases contention window sizes (CWSs) corresponding to all channel access priority classes through the processor 40. Then, the UE 1 performs activated second AUL transmission through the U-band based on the increased CWSs, using the transmitter 10.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 21 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method performed by a user equipment (UE) operating in a wireless communication system, the method comprising:
 performing an autonomous uplink (AUL) transmission starting before time unit n using a channel access procedure (CAP) on a unlicensed band, wherein n is an integer; and
 performing a scheduled uplink (SUL) transmission starting from the time unit n on the unlicensed band,
 wherein depending on whether a priority class value for channel access for the AUL transmission is equal to or larger than a priority class value for channel access for the SUL transmission, the SUL transmission starts from the time unit n either without a gap or with a gap after the AUL transmission, such that:
    based on the priority class value for channel access for the AUL transmission not being equal to or larger than the priority class value for channel access for the SUL transmission: the AUL transmission is terminated, while the AUL transmission is ongoing and before the AUL transmission ends, with the gap before the time unit n at which the SUL transmission starts.

2. The method of claim 1, wherein the time unit n is one of:
    a first time unit where a first time interval configured for the AUL transmission overlaps with a second time interval scheduled for the SUL transmission, or
    a second time unit following a third time unit configured for the AUL transmission.

3. The method of claim 1, wherein the gap comprises one or more symbols.

4. The method of claim 1, wherein based on the priority class value for channel access for the AUL transmission being equal to or larger than the priority class value for channel access for the SUL transmission: the SUL transmission starts from the time unit n without the gap after the AUL transmission ends such that the SUL transmission is performed without the CAP for the SUL transmission.

5. The method of claim 1, wherein the AUL transmission is activated based on a first downlink control information (DCI), and
    wherein the AUL transmission is released based on a second DCI.

6. The method of claim 5, wherein the first DCI is distinguished from the second DCI based on a value of a first field of the first DCI and a value of a first field of the second DCI, and
    wherein the first field of the first DCI and the first field of the second DCI are timing offset fields.

7. The method of claim 6, wherein a second field of the first DCI and a second field of the second DCI have an identical value, and
    wherein a second field of a third DCI for acknowledgement of the AUL transmission has a different value from the second field of the first DCI and the second field of the second DCI.

8. The method of claim 7, wherein the second field of the first DCI, the second field of the second DCI, and the second field of the third DCI are physical uplink shared channel (PUSCH) trigger A fields.

9. The method of claim 7, wherein the first DCI, the second DCI and the third DCI have an identical size.

10. The method of claim 7, wherein the first DCI, the second DCI and the third DCI are scrambled by a radio network temporary identifier (RNTI) different from a cell-RNTI (C-RNTI).

11. The method of claim 1, wherein based on the priority class value for channel access for the AUL transmission being equal to or larger than the priority class value for channel access for the SUL transmission: the SUL transmission starts from the time unit n without the gap after the AUL transmission such that the SUL transmission starts from the time unit n without a listen-before-talk (LBT) gap after the AUL transmission.

12. The method of claim 1, wherein a sum of a duration of the AUL transmission and a duration of the SUL transmission does not exceed a maximum channel occupancy time (MCOT) for the AUL transmission.

13. The method of claim 1, wherein based on the priority class value for channel access for the AUL transmission being equal to or larger than the priority class value for channel access for the SUL transmission: the SUL transmission starts from the time unit n without gap after the AUL transmission ends.

14. A user equipment (UE) configured to operate in a wireless communication system, the UE comprising:
    a transceiver;
    at least one processor; and
    at least one computer memory operably connectable to the at least one processor and storing instructions that, when executed by the at least one processor, perform operations comprising:
    performing, through the transceiver, an autonomous uplink (AUL) transmission starting before time unit n using a channel access procedure (CAP) on a unlicensed band, wherein n is an integer; and
    performing, through the transceiver, a scheduled uplink (SUL) transmission starting from the time unit n on the unlicensed band,
    wherein depending on whether a priority class value for channel access for the AUL transmission is equal to or larger than a priority class value for channel access for the SUL transmission, the SUL transmission starts from the time unit n either without a gap or with a gap after the AUL transmission, such that:
        based on the priority class value for channel access for the AUL transmission not being equal to or larger than the priority class value for channel access for the SUL transmission: the AUL transmission is terminated, while the AUL transmission is ongoing and before the AUL transmission ends, with the gap before the time unit n at which the SUL transmission starts.

15. A communication device configured to operate in a wireless communication system, the communication device comprising:
    at least one processor; and
    at least one memory operably connectable to the at least one processor and storing instructions that, when executed by the at least one processor, perform operations comprising:
    performing an autonomous uplink (AUL) transmission starting before time unit n using a channel access procedure (CAP) on a unlicensed band, wherein n is an integer; and
    performing a scheduled uplink (SUL) transmission starting from the time unit n on the unlicensed band,
    wherein depending on whether a priority class value for channel access for the AUL transmission is equal to or larger than a priority class value for channel access for the SUL transmission, the SUL transmission starts from the time unit n either without a gap or with a gap after the AUL transmission, such that:
        based on the priority class value for channel access for the AUL transmission not being equal to or larger than the priority class value for channel access for the SUL transmission: the AUL transmission is terminated, while the AUL transmission is ongoing and before the AUL transmission ends, with the gap before the time unit n at which the SUL transmission starts.

* * * * *